(12) United States Patent
Chen

(10) Patent No.: US 12,206,654 B2
(45) Date of Patent: Jan. 21, 2025

(54) METHOD FOR AUTHENTICATING ACCESS NETWORK DEVICE, AND RELATED DEVICE

(71) Applicant: HUAWEI TECHNOLOGIES CO., LTD., Guangdong (CN)

(72) Inventor: Li Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 17/589,242

(22) Filed: Jan. 31, 2022

(65) Prior Publication Data

US 2022/0159458 A1 May 19, 2022

Related U.S. Application Data

(63) Continuation of application No. PCT/CN2020/084142, filed on Apr. 10, 2020.

(30) Foreign Application Priority Data

Jul. 31, 2019 (CN) .......................... 201910703626.1

(51) Int. Cl.
*H04L 9/40* (2022.01)
*H04W 12/06* (2021.01)
(Continued)

(52) U.S. Cl.
CPC ............. *H04L 63/08* (2013.01); *H04W 12/06* (2013.01); *H04W 12/08* (2013.01); *H04W 12/61* (2021.01)

(58) Field of Classification Search
None
See application file for complete search history.

(56) References Cited

U.S. PATENT DOCUMENTS 10,200,862 B2 2/2019 Nair et al.
2002/0116637 A1* 8/2002 Deitsch ................. G06F 21/305
726/12

(Continued)

FOREIGN PATENT DOCUMENTS

CN 101272251 A 9/2008
CN 101471784 A 7/2009
(Continued)

OTHER PUBLICATIONS

"3rd Generation Partnership Project; Technical Specification Group Services and System Aspects; Study on 5G Security Enhancement against False Base Stations (Release 16)", 3GPP Standard; Technical Report; 3GPP TR 33.809, No. V0.5.0 (3GPP).*

(Continued)

*Primary Examiner* — Lance Leonard Barry

(57) ABSTRACT

Embodiments of this application disclose a method for authenticating an access network device. The method includes a terminal device sends an authentication request to the access network device. The terminal device receives, in a first transmission time unit, a first authentication request response in response to the authentication request. The terminal device obtains first time window information in the first authentication request response. The first time window information indicates a time range in which the terminal device receives the first authentication request response and a first time window indicated by the first time window information comprises at least one transmission time unit. The terminal device determines that the access network device is a legal access network device when the terminal device determines that the first transmission time unit falls within the first time window.

19 Claims, 12 Drawing Sheets

(51) Int. Cl.
  *H04W 12/08* (2021.01)
  *H04W 12/61* (2021.01)

(56) References Cited

U.S. PATENT DOCUMENTS

| | | | |
|---|---|---|---|
| 2010/0011220 A1* | 1/2010 | Zhao | H04L 9/3271 |
| | | | 726/28 |
| 2011/0317672 A1 | 12/2011 | Inatomi et al. | |
| 2012/0289211 A1* | 11/2012 | Meriaz | H04M 3/42195 |
| | | | 455/415 |
| 2013/0151857 A1 | 6/2013 | Agrawal | |
| 2013/0179736 A1* | 7/2013 | Gschwind | G06F 11/3006 |
| | | | 714/E11.029 |
| 2014/0380052 A1 | 12/2014 | Tao et al. | |
| 2015/0026783 A1* | 1/2015 | Tseng | H04W 12/06 |
| | | | 726/6 |
| 2015/0271675 A1 | 9/2015 | Cheng et al. | |
| 2016/0173498 A1* | 6/2016 | Liu | H04W 12/06 |
| | | | 726/6 |
| 2017/0164200 A1 | 6/2017 | Slund et al. | |
| 2017/0193277 A1* | 7/2017 | Hong | G06V 40/1365 |
| 2017/0208648 A1* | 7/2017 | Choi | H04W 76/38 |
| 2017/0244697 A1 | 8/2017 | Caceres et al. | |
| 2017/0288879 A1 | 10/2017 | Quinlan et al. | |
| 2018/0124697 A1 | 5/2018 | Nair et al. | |
| 2018/0214075 A1* | 8/2018 | Falevsky | G16H 50/30 |
| 2019/0200391 A1* | 6/2019 | Li | H04W 74/0833 |
| 2019/0215864 A1* | 7/2019 | Yang | H04W 74/02 |
| 2020/0057689 A1* | 2/2020 | Farahat | G06F 11/0751 |

FOREIGN PATENT DOCUMENTS

| | | | | |
|---|---|---|---|---|
| CN | 101765033 A * | 6/2010 | | |
| CN | 104703181 A | 6/2015 | | |
| CN | 108512848 A | 9/2018 | | |
| CN | 109064261 A * | 12/2018 | | G06Q 30/0631 |
| WO | 2005025248 A1 | 3/2005 | | |
| WO | 2018231426 A1 | 12/2018 | | |
| WO | WO-2019138531 A1 * | 7/2019 | | H04B 7/0695 |

OTHER PUBLICATIONS

Perumalraja Rengaraju et al., Analysis on mobile WiMAX security. 2009 IEEE Toronto International Conference Science and Technology for Humanity (TIC-STH), Sep. 26-27, 2009, 6 pages.

3GPP TR 33.809 V0.5.0 (Jun. 2019), 3rd Generation Partnership Project; Technical Specification Group Services and System Aspects; Study on 5G Security Enhancement against False Base Stations (Release 16), 54 pages.

Extended European Search Report issued in EP20848384.2, dated Jul. 13, 2022, 11 pages.

Liao Jun-kai et al, Security Threats of LTE Wireless Air Interface, Communications Technology ,2017, 7 pages.

3GPP TR 33.809 V0.4.0:"3rd Generation Partnership Project; Technical Specification Group Services and System Aspects; Study on 5G Security Enhancement against False Base Stations(Release 16)",May 2019,total 49 pages.

Kaustav Chatterjee et al, Data-driven Online Detection of Replay Attacks on Wide-Area Measurement Systems, Proceedings of the National Power Systems Conference (NPSC)—Dec. 14-16, 2018, NIT Tiruchirappalli, India, 6 pages.

Intel Key Issue for Fake Base Station[online] 3GPP TSG SA WG3 #94AH S3-190676, Mar. 4, 2019, total 4 pages.

Notice of Allowance issued in JP2022-506255, dated Apr. 3, 2023, 3 pages.

* cited by examiner

METHOD FOR AUTHENTICATING ACCESS NETWORK DEVICE, AND RELATED DEVICE

CROSS-REFERENCE TO RELATED APPLICATIONS

This application is a continuation of International Application No. PCT/CN2020/084142, filed on Apr. 10, 2020, which claims priority to Chinese Patent Application No. 201910703626.1, filed on Jul. 31, 2019. The disclosures of the aforementioned applications are hereby incorporated by reference in their entireties.

TECHNICAL FIELD

Embodiments of this application relate to the communication field, and in particular, to a method for authenticating an access network device, and a related device.

BACKGROUND

A pseudo base station, also referred to as a rogue base station and a fake base station, is an illegal radio communication device that attracts, by increasing transmit power, a legal terminal device to access. For this reason, the pseudo base station is also referred to as an illegal access network device. The illegal access network device induces the legal terminal device to connect to the illegal access network device, and sends an illegal message to the legal terminal device or steals information about the legal terminal device.

Currently, to prevent the illegal access network device from causing a threat to communication security, before the legal terminal device connects to an access network device, the legal terminal device checks legality of the access network device by receiving a system message broadcast by the access network device.

In this solution, because the legal terminal device receives the system message which is a unidirectional message broadcast by the access network device, an attacker may launch a replay attack on a legal access network device and the legal terminal device in cooperation with the illegal access network device and an illegal terminal device, so as to intercept, duplicate, and resend the broadcast message. The legal terminal device may receive the broadcast message duplicated and resent by the illegal access network device, and the legal access network device may receive a response message duplicated and resent by the illegal terminal device. As a result, it is difficult for both the legal terminal device and the legal access network device to detect an exception, that is, the legal terminal device cannot learn whether an access network device communicating with the legal terminal device is a legal access network device. Therefore, communication security between the legal terminal device and the legal access network device is affected.

SUMMARY

Embodiments of this application provide a method for authenticating an access network device and a related device, to determine whether an access network device communicating with a terminal device is a legal access network device.

According to a first aspect, an embodiment of this application provides a method for authenticating an access network device. In the method, a terminal device first sends an authentication request to an access network device that needs to be authenticated, and if the terminal device receives, in a first transmission time unit, a first authentication request response in response to the authentication request, and obtains first time window information in the first authentication request response, the terminal device may determine that the access network device may be a legal access network device. However, the terminal device cannot exclude a case in which an illegal access network device launches a replay attack on the terminal device and the access network device. Therefore, the terminal device further needs to determine whether the first transmission time unit in which the terminal device receives the first authentication request response falls within a first time window indicated by the first time window information. If the first transmission time unit falls within the first time window, the terminal device can determine that the first authentication request response is directly sent by a legal access network device to the terminal device and is not duplicated and resent by an illegal access network device. Therefore, the terminal device can determine that the access network device authenticated by the terminal device is a legal access network device.

In this implementation, the first time window information is used to indicate a time range in which the terminal device receives the first authentication request response, and the first time window indicated by the first time window information includes at least one transmission time unit.

In a replay attack, provided that an illegal access network device and an illegal terminal device intervene in communication between the terminal device and a legal access network device, a delay of two more air interface transmissions is necessarily introduced between the terminal device and the legal access network device. As a result, the first transmission time unit does not fall within the first time window. Therefore, according to such a solution, the terminal device can determine whether an access network device communicating with the terminal device is a legal access network device, and can determine whether the terminal device suffers a replay attack, so that communication security between the legal terminal device and the legal access network device can be ensured.

According to the first aspect, in a first implementation of the first aspect of the embodiments of this application, the method further includes: when the terminal device determines that the first transmission time unit falls outside the first time window, the terminal device sends a prompt message to the access network device, where the prompt message is used to prompt the access network device that the first transmission time unit falls outside the first time window. The terminal device receives, in a second transmission time unit, a second authentication request response in response to the authentication request, where the second authentication request response includes second time window information, the second time window information is used to indicate a time range in which the terminal device receives the second authentication request response, and a second time window indicated by the second time window information includes at least one transmission time unit.

This implementation provides a solution for the terminal device to authenticate the access network device when the terminal device determines that the first transmission time unit falls outside the first time window. In this case, to exclude a case in which the first transmission time unit falls outside the first time window due to an error introduced by a network delay, the terminal device sends a prompt message to the access network device. The prompt message is used to report such a result that "the first transmission time unit falls outside the first time window" to the access network device. If the access network device is a legal access network device, the access network device autonomously determines, based on the content of the indication message, whether to send the second authentication request response corresponding to the authentication request. If the terminal device can receive the second authentication request response at a moment after the prompt message is sent, the terminal device can further authenticate the access network device. Therefore, this can avoid that the terminal device mistakenly considers a legal access network device as an illegal access network device due to an accidental factor such as a network delay.

According to the first aspect, in a second implementation of the first aspect of the embodiments of this application, the method further includes: when the terminal device determines that the first transmission time unit falls outside the first time window, the terminal device sends a prompt message to the access network device, where the prompt message is used to indicate the access network device to send a second authentication request response to the terminal device, the second authentication request response includes second time window information, the second time window information is used to indicate a time range in which the terminal device receives the second authentication request response, and a second time window indicated by the second time window information includes at least one transmission time unit. The terminal device receives, in a second transmission time unit, the second authentication request response in response to the authentication request.

This implementation provides another solution for the terminal device to authenticate the access network device when the terminal device determines that the first transmission time unit falls outside the first time window. In this case, the terminal device is also to send a prompt message to the access network device. However, the prompt message is used to indicate the access network device to send the second authentication request response to the terminal device. In other words, the terminal device determines that the access network device needs to send the second authentication request response to the terminal device. If the terminal device can receive the second authentication request response at a moment after the prompt message is sent, the terminal device can further authenticate the access network device. Therefore, this can avoid that the terminal device mistakenly considers a legal access network device as an illegal access network device due to an accidental factor such as a network delay.

It should be understood that, the terminal device needs to send a prompt message to the access network device in this implementation and the first implementation of the first aspect, but content of the prompt message in the first implementation of the first aspect is different from content of the prompt message in the second implementation of the first aspect. In actual application, the terminal device may select an implementation for use based on a specific requirement.

According to the first implementation of the first aspect or the second implementation of the first aspect, in a third implementation of the first aspect of the embodiments of this application, when the terminal device receives, in the second transmission time unit, the second authentication request response in response to the authentication request, the method further includes: The terminal device obtains, in the second transmission time unit, the second time window information in the second authentication request response. When the terminal device determines that the second transmission time unit falls within the second time window, the terminal device determines that the access network device is a legal access network device.

In this implementation, when the terminal device receives, in the second transmission time unit, the second authentication request response in response to the authentication request, the terminal device further obtains, in the second transmission time unit, the second time window information in the second authentication request response. That is, when the terminal device receives the second authentication request response, the terminal device may immediately obtain the second time window information in the second authentication request response, and determine whether the second transmission time unit falls within the second time window. When the second transmission time unit falls within the second time window, the terminal device determines that the access network device is a legal access network device. In this implementation, even if the first transmission time unit falls outside the first time window, but the second transmission time unit falls within the second time window, it indicates that the second authentication request response received by the terminal device is directly sent by a legal access network device. Therefore, the terminal device may accurately determine that the access network device is a legal access network device.

According to the first implementation of the first aspect or the second implementation of the first aspect, in a fourth implementation of the first aspect of the embodiments of this application, the method further includes: When the terminal device sends the authentication request, the terminal device starts an authentication timer. When duration indicated by the authentication timer is greater than preset authentication duration, the terminal device determines that the access network device is an illegal access network device.

This implementation provides a solution when the second transmission time unit falls outside the second time window. If a transmission time unit corresponding to a moment at which the terminal device receives an authentication request response each time falls within a time window indicated by time window information in the authentication request response, the terminal device is always in a cyclic authentication state, so that the terminal device starts the authentication timer when sending the authentication request. The authentication timer is configured to record duration used for authenticating the access network device by the terminal device. When the duration indicated by the authentication timer is greater than the preset authentication duration, that is, when the duration of the authentication process reaches the preset authentication duration, the terminal device determines that the access network device is an illegal access network device. In this implementation, the terminal device may further control the duration of the authentication process by adjusting the preset authentication duration, so that the method provided in this embodiment of this application may be applied to more application scenarios.

According to the first implementation of the first aspect or the second implementation of the first aspect, in a fifth implementation of the first aspect of the embodiments of this application, the method further includes: The terminal device records accumulated authentication duration, where the accumulated authentication duration is duration from sending the authentication request by the terminal device to receiving an authentication request response in response to the authentication request by the terminal device, where the authentication request response includes a first authentication request response or a second authentication request response. When the accumulated authentication duration is greater than preset authentication duration, the terminal device determines that the access network device is an illegal access network device.

In this implementation, each time the terminal device receives the authentication request response, the terminal device records the accumulated authentication duration once. Therefore, the terminal device may calculate the duration from sending the authentication request by the terminal device to receiving the authentication request response by the terminal device, or duration from sending the prompt message by the terminal device to receiving the authentication request response by the terminal device. Therefore, the terminal device may not only determine whether the access network device is a legal access network device by determining whether the accumulated authentication duration exceeds the preset authentication duration, but also the terminal device may further perform statistical analysis on the accumulated authentication duration obtained in a plurality of times, to determine more appropriate preset authentication duration.

According to any one of the first implementation of the first aspect, the second implementation of the first aspect, the fourth implementation of the first aspect, or the fifth implementation of the first aspect, in a sixth implementation of the first aspect of the embodiments of this application, the method further includes: The terminal device records an accumulated quantity of authentication times, where the accumulated quantity of authentication times is a quantity of times that a moment at which the terminal device receives the authentication request response falls outside a time window corresponding to the authentication request response. When the accumulated quantity of authentication times is greater than a preset quantity of authentication times, the terminal device determines that the access network device is an illegal access network device.

This implementation provides a solution for the terminal device to record the accumulated quantity of authentication times. In this solution, when the accumulated quantity of authentication times is greater than the preset quantity of authentication times, that is, when the quantity of times that the moment at which the terminal device receives the authentication request response falls outside the time window corresponding to the authentication request response is greater than the preset quantity of authentication times, the terminal device may determine that the access network device is an illegal access network device.

According to any one of the first aspect, or the first implementation of the first aspect to the sixth implementation of the first aspect, in a seventh implementation of the first aspect of the embodiments of this application, the first time window information includes a first start point of the first time window and a first end point of the first time window, the first start point is used to indicate a transmission time unit corresponding to an earliest moment that is determined by the access network device and at which the terminal device receives the authentication request response, and the first end point is used to indicate a transmission time unit corresponding to a latest moment that is determined by the access network device and at which the terminal device receives the authentication request response.

This implementation provides a manner of representing the first time window. Because both the first start point and the first end point are absolute transmission time units rather than relative metric units, the first start point and the first end point can define an exact time range.

According to any one of the first aspect, or the first implementation of the first aspect to the sixth implementation of the first aspect, in an eighth implementation of the first aspect of the embodiments of this application, the first time window information includes a first start point of the first time window and first recommended duration of the first time window, the first start point is used to indicate a transmission time unit corresponding to an earliest moment that is determined by the access network device and at which the terminal device receives the authentication request response, and the first recommended duration is used to indicate a length of the first time window.

This implementation provides another manner of representing the first time window. In this implementation, although the first recommended duration is relative metrics, because the first start point is an absolute transmission time unit, and a left end point of the first recommended duration is the first start point, the first start point and the first recommended duration can define an exact time range.

According to any one of the first aspect, or the first implementation of the first aspect to the eighth implementation of the first aspect, in a ninth implementation of the first aspect of the embodiments of this application, the authentication request includes third time window information, and the third time window information is used to indicate the access network device to determine a reference range of the first time window information or the second time window information.

In this implementation, the terminal device may send the third time window information to the access network device, and the third time window information is used to indicate the access network device to determine the reference range of the first time window information or the second time window information. That is, the access network device may determine the first time window information or the second time window information with reference to the third time window information.

According to the ninth implementation of the first aspect, in a tenth implementation of the first aspect of the embodiments of this application, before a terminal device sends an authentication request to an access network device, the method further includes: The terminal device receives a system message sent by the access network device, where the system message includes fourth recommended duration. The terminal device determines the third time window information based on the fourth recommended duration.

In this implementation, the terminal device may receive the system message sent by the access network device, where the system message includes the fourth recommended duration for determining the third time window information. In this case, the access network device may influence, by configuring the fourth recommended duration, the terminal device in determining the third time window information. The terminal device may determine the third time window information based on an actual network condition.

According to the ninth implementation of the first aspect or the tenth implementation of the first aspect, in an eleventh implementation of the first aspect of the embodiments of this application, the third time window information includes a third start point of a third time window and a third end point of the third time window, the third start point is used to indicate a transmission time unit corresponding to a moment at which the terminal device sends the authentication request, and the third end point is used to indicate a transmission time unit corresponding to a latest moment that is determined by the terminal device and at which the access network device receives the authentication request.

This implementation provides a manner of representing the third time window. Similar to the first time window information, because both the third start point and the third end point are absolute transmission time units rather than relative metric units, the third start point and the third end point can define an exact time range. It should be noted that, in this implementation, the third start point is a transmission time unit corresponding to a moment at which the terminal sends the authentication request.

According to the ninth implementation of the first aspect or the tenth implementation of the first aspect, in a twelfth implementation of the first aspect of the embodiments of this application, the third time window information includes a third start point of a third time window and third recommended duration of the third time window, the third start point is used to indicate a transmission time unit corresponding to a moment at which the terminal device sends the authentication request, and the third recommended duration is used to indicate a length of the third time window.

This implementation provides another manner of representing the third time window. In this implementation, although the third recommended duration is relative metrics, because the third start point is an absolute transmission time unit, and a left end point of the third recommended duration is the third start point, the third start point and the third recommended duration can define an exact time range.

According to the ninth implementation of the first aspect or the tenth implementation of the first aspect, in a thirteenth implementation of the first aspect of the embodiments of this application, the third time window information includes a third start point of a third time window and a third end point of the third time window, the third start point is used to indicate a transmission time unit corresponding to a moment that is determined by the terminal device and at which the access network device sends the authentication request response, and the third end point is used to indicate a transmission time unit corresponding to a latest moment that is determined by the terminal device and at which the authentication request response is received.

This implementation provides another manner of representing the third time window. Similar to the first time window information, because both the third start point and the third end point are absolute transmission time units rather than relative metric units, the third start point and the third end point can define an exact time range. It should be noted that, in this implementation, the third start point is used to indicate the transmission time unit corresponding to the moment that is determined by the terminal device and at which the access network device sends the first authentication request response, that is, the terminal device predicts data transmission between the terminal device and the access network device. Therefore, the access network device may determine whether the terminal device is a legal terminal device based on whether the transmission time unit corresponding to the moment at which the access network device receives the authentication request falls within the third time window indicated by the third time window information.

According to the ninth implementation of the first aspect or the tenth implementation of the first aspect, in a fourteenth implementation of the first aspect of the embodiments of this application, the third time window information includes a third start point of a third time window and third recommended duration of the third time window, the third start point is used to indicate a transmission time unit corresponding to a moment that is determined by the terminal device and at which the access network device sends the authentication request response, and the third recommended duration is used to indicate a length of the third time window.

This implementation provides that the third recommended duration includes the third start point and the third recommended duration. The third start point is an absolute transmission time unit, and the third recommended duration is relative metrics. Therefore, an exact time range can be determined. In addition, similar to the fourteenth implementation of the first aspect, the third start point is used to indicate the transmission time unit corresponding to the moment that is determined by the terminal device and at which the access network device sends the first authentication request response, that is, the terminal device predicts data transmission between the terminal device and the access network device. Therefore, the access network device may determine whether the terminal device is a legal terminal device based on whether the transmission time unit corresponding to the moment at which the access network device receives the authentication request falls within the third time window indicated by the third time window information.

According to a second aspect, an embodiment of this application provides a method for authenticating an access network device. In the method, an access network device receives an authentication request sent by a terminal device; and the access network device sends a first authentication request response corresponding to the authentication request to the terminal device, where the first authentication request response includes first time window information, the first time window information is used to indicate a time range in which the terminal device receives the first authentication request response, and a first time window indicated by the first time window information includes at least one transmission time unit.

In a replay attack, regardless of whether an illegal access network device modifies the first authentication request response, provided that the illegal access network device and an illegal terminal device intervene in communication between the terminal device and a legal access network device, a delay of two more air interface transmissions is necessarily introduced between the terminal device and the legal access network device. As a result, the first transmission time unit does not fall within the first time window. Therefore, according to such a solution, the terminal device can determine whether an access network device communicating with the terminal device is a legal access network device, and can determine whether the terminal device suffers a replay attack, so that communication security between the legal terminal device and the legal access network device can be ensured.

According to the second aspect, in a first implementation of the second aspect of the embodiments of this application, after the access network device sends a first authentication request response corresponding to the authentication request to the terminal device, the method further includes: The access network device receives a prompt message sent by the terminal device, where the prompt message is used to prompt the access network device that a first transmission time unit falls outside the first time window. The access network device sends a second authentication request response corresponding to the authentication request to the terminal device, where the second authentication request response includes second time window information, the second time window information is used to indicate a time range in which the terminal device receives the second authentication request response, and a second time window indicated by the second time window information includes at least one transmission time unit.

In this implementation, the access network device determines whether to send the second authentication request response corresponding to the authentication request, based on such a result that "the first transmission time unit falls outside the first time window" in an indication message sent by the terminal device. In this case, the access network device may send the second authentication request response to the terminal device, and the second authentication request response includes the second time window information. Such an implementation can avoid that the terminal device mistakenly considers a legal access network device as an illegal access network device due to an accidental factor such as a network delay.

According to the second aspect, in a second implementation of the second aspect of the embodiments of this application, the method further includes: The access network device receives a prompt message sent by the terminal device, where the prompt message is used to indicate the access network device to send a second authentication request response corresponding to the authentication request to the terminal device, the second authentication request response includes second time window information, the second time window information is used to indicate a time range in which the terminal device receives the second authentication request response, and a second time window indicated by the second time window information includes at least one transmission time unit. The access network device sends the second authentication request response to the terminal device.

In this implementation, after the access network device receives the prompt message sent by the terminal device, the access network device also sends the second authentication request response to the terminal device. However, different from the prompt message that is described in the first implementation of the second aspect and that indicates such a result that "the first transmission time unit falls outside the first time window", the prompt message in this implementation indicates that the terminal device requires the access network device to send the second authentication request response to the terminal device. However, such an implementation can also avoid that the terminal device mistakenly considers a legal access network device as an illegal access network device due to an accidental factor such as a network delay.

According to the second aspect, the first implementation of the second aspect, or the second implementation of the second aspect, in a third implementation of the second aspect of the embodiments of this application, the authentication request includes third time window information, and the third time window information is used to indicate the access network device to determine a reference range of the first time window information or the second time window information. After an access network device receives an authentication request sent by a terminal device, and before the access network device sends a first authentication request response corresponding to the authentication request to the terminal device, the method further includes: The access network device determines the first time window information based on the third time window information.

This implementation provides another manner of determining the first time window information. In this implementation, the access network device may determine the first time window information with reference to the third time window information in the authentication request. Therefore, the first time window information determined by the access network device is more accurate, and accuracy of authenticating the access network device by the terminal device can be improved.

According to any one of the second aspect, or the first implementation of the second aspect to the third implementation of the second aspect, in a fourth implementation of the second aspect of the embodiments of this application, the first time window information includes a first start point of the first time window and a first end point of the first time window, the first start point is used to indicate a transmission time unit corresponding to an earliest moment that is determined by the access network device and at which the terminal device receives an authentication request response, and the first end point is used to indicate a transmission time unit corresponding to a latest moment that is determined by the access network device and at which the terminal device receives the authentication request response.

This implementation provides a manner of representing the first time window. Because both the first start point and the first end point are absolute transmission time units rather than relative metric units, the first start point and the first end point can define an exact time range.

According to any one of the second aspect, or the first implementation of the second aspect to the third implementation of the second aspect, in a fifth implementation of the second aspect of the embodiments of this application, the first time window information includes a first start point of the first time window and first recommended duration of the first time window, the first start point is used to indicate a transmission time unit corresponding to an earliest moment that is determined by the access network device and at which the terminal device receives an authentication request response, and the first recommended duration is used to indicate a length of the first time window.

This implementation provides another manner of representing the first time window. In this implementation, although the first recommended duration is relative metrics, because the first start point is an absolute transmission time unit, and a left end point of the first recommended duration is the first start point, the first start point and the first recommended duration can define an exact time range.

According to a third aspect, an embodiment of this application provides a communication device. The communication device includes:

a transceiver module, configured to send an authentication request to an access network device, where the transceiver module is further configured to receive, in a first transmission time unit, a first authentication request response in response to the authentication request; and a processing module, configured to obtain first time window information in the first authentication request response, where the first time window information is used to indicate a time range in which the terminal device receives the first authentication request response, and a first time window indicated by the first time window information includes at least one transmission time unit, where the processing module is further configured to: when the terminal device determines that the first transmission time unit falls within the first time window, determine that the access network device is a legal access network device.

In this implementation, the first time window information is used to indicate a time range in which the terminal device receives the first authentication request response, and the first time window indicated by the first time window information includes at least one transmission time unit.

In a replay attack, regardless of whether an illegal access network device modifies the first authentication request response, provided that the illegal access network device and an illegal terminal device intervene in communication between the terminal device and a legal access network device, a delay of two more air interface transmissions is necessarily introduced between the terminal device and the legal access network device. As a result, the first transmission time unit does not fall within the first time window. Therefore, according to such a solution, the terminal device can determine whether an access network device communicating with the terminal device is a legal access network device, and can determine whether the terminal device suffers a replay attack, so that communication security between the legal terminal device and the legal access network device can be ensured.

According to the third aspect, in a first implementation of the third aspect of the embodiments of this application, the processing module is further configured to: when the terminal device determines that the first transmission time unit falls outside the first time window, control the transceiver module to send a prompt message to the access network device, where the prompt message is used to prompt the access network device that the first transmission time unit falls outside the first time window; and the transceiver module is further configured to receive, in a second transmission time unit, a second authentication request response in response to the authentication request, where the second authentication request response includes second time window information, the second time window information is used to indicate a time range in which the terminal device receives the second authentication request response, and a second time window indicated by the second time window information includes at least one transmission time unit.

This implementation provides a solution for the terminal device to authenticate the access network device when the terminal device determines that the first transmission time unit falls outside the first time window. In this case, to exclude a case in which the first transmission time unit falls outside the first time window due to an error introduced by a network delay, the terminal device sends a prompt message to the access network device. The prompt message is used to report such a result that "the first transmission time unit falls outside the first time window" to the access network device. If the access network device is a legal access network device, the access network device autonomously determines, based on the content of the indication message, whether to send the second authentication request response corresponding to the authentication request. If the terminal device can receive the second authentication request response at a moment after the prompt message is sent, the terminal device can further authenticate the access network device. Therefore, this can avoid that the terminal device mistakenly considers a legal access network device as an illegal access network device due to an accidental factor such as a network delay.

According to the third aspect, in a second implementation of the third aspect of the embodiments of this application, the processing module is further configured to: when the terminal device determines that the first transmission time unit falls outside the first time window, control the transceiver module to send a prompt message to the access network device, where the prompt message is used to indicate the access network device to send a second authentication request response to the terminal device, the second authentication request response includes second time window information, the second time window information is used to indicate a time range in which the terminal device receives the second authentication request response, and a second time window indicated by the second time window information includes at least one transmission time unit; and the transceiver module is further configured to receive, in the second transmission time unit, the second authentication request response in response to the authentication request.

This implementation provides another solution for the terminal device to authenticate the access network device when the terminal device determines that the first transmission time unit falls outside the first time window. In this case, the terminal device is also to send a prompt message to the access network device. However, the prompt message is used to indicate the access network device to send the second authentication request response to the terminal device. In other words, the terminal device determines that the access network device needs to send the second authentication request response to the terminal device. If the terminal device can receive the second authentication request response at a moment after the prompt message is sent, the terminal device can further authenticate the access network device. Therefore, this can avoid that the terminal device mistakenly considers a legal access network device as an illegal access network device due to an accidental factor such as a network delay.

It should be understood that, the terminal device needs to send a prompt message to the access network device in this implementation and the first implementation of the third aspect and, but content of the prompt message in the first implementation of the third aspect is different from content of the prompt message in the second implementation of the third aspect. In actual application, the terminal device may select an implementation for use based on a specific requirement.

According to the first implementation of the third aspect or the second implementation of the third aspect, in a third implementation of the third aspect of the embodiments of this application, the processing module is further configured to: obtain, in the second transmission time unit, the second time window information in the second authentication request response; and when the terminal device determines that the second transmission time unit falls within the second time window, determine that the access network device is a legal access network device.

In this implementation, when the terminal device receives, in the second transmission time unit, the second authentication request response in response to the authentication request, the terminal device further obtains, in the second transmission time unit, the second time window information in the second authentication request response. That is, when the terminal device receives the second authentication request response, the terminal device may immediately obtain the second time window information in the second authentication request response, and determine whether the second transmission time unit falls within the second time window. When the second transmission time unit falls within the second time window, the terminal device determines that the access network device is a legal access network device. In this implementation, even if the first transmission time unit falls outside the first time window, but the second transmission time unit falls within the second time window, it indicates that the second authentication request response received by the terminal device is directly sent by a legal access network device. Therefore, the terminal device may accurately determine that the access network device is a legal access network device.

According to the first implementation of the third aspect or the second implementation of the third aspect, in a fourth implementation of the third aspect of the embodiments of this application, the processing module is further configured to: when the terminal device sends the authentication request, start an authentication timer; and when duration indicated by the authentication timer is greater than preset authentication duration, determine that the access network device is an illegal access network device.

This implementation provides a solution when the second transmission time unit falls outside the second time window. If a transmission time unit corresponding to a moment at which the terminal device receives an authentication request response each time falls within a time window indicated by time window information in the authentication request response, the terminal device is always in a cyclic authentication state, so that the terminal device starts the authentication timer when sending the authentication request. The authentication timer is configured to record duration used for authenticating the access network device by the terminal device. When the duration indicated by the authentication timer is greater than the preset authentication duration, that is, when the duration of the authentication process reaches the preset authentication duration, the terminal device determines that the access network device is an illegal access network device. In this implementation, the terminal device may further control the duration of the authentication process by adjusting the preset authentication duration, so that the method provided in this embodiment of this application may be applied to more application scenarios.

According to the first implementation of the third aspect or the second implementation of the third aspect, in a fifth implementation of the third aspect of the embodiments of this application, the processing module is further configured to: record accumulated authentication duration, where the accumulated authentication duration is duration from sending the authentication request by the terminal device to receiving an authentication request response in response to the authentication request by the terminal device, where the authentication request response includes a first authentication request response or a second authentication request response; and when the accumulated authentication duration is greater than the preset authentication duration, determine that the access network device is an illegal access network device.

In this implementation, each time the terminal device receives the authentication request response, the terminal device records the accumulated authentication duration once. Therefore, the terminal device may calculate the duration from sending the authentication request by the terminal device to receiving the authentication request response by the terminal device, or duration from sending the prompt message by the terminal device to receiving the authentication request response by the terminal device. Therefore, the terminal device may not only determine whether the access network device is a legal access network device by determining whether the accumulated authentication duration exceeds the preset authentication duration, but also the terminal device may further perform statistical analysis on the accumulated authentication duration obtained in a plurality of times, to determine more appropriate preset authentication duration.

According to any one of the first implementation of the third aspect, the second implementation of the third aspect, the fourth implementation of the third aspect, or the fifth implementation of the third aspect, in a sixth implementation of the third aspect of the embodiments of this application, the processing module is further configured to: record an accumulated quantity of authentication times, where the accumulated quantity of authentication times is a quantity of times that a moment at which the terminal device receives the authentication request response falls outside a time window corresponding to the authentication request response; and when the accumulated quantity of authentication times is greater than a preset quantity of authentication times, determine that the access network device is an illegal access network device.

This implementation provides a solution for the terminal device to record the accumulated quantity of authentication times. In this solution, when the accumulated quantity of authentication times is greater than the preset quantity of authentication times, that is, when the quantity of times that the moment at which the terminal device receives the authentication request response falls outside the time window corresponding to the authentication request response is greater than the preset quantity of authentication times, the terminal device may determine that the access network device is an illegal access network device.

According to a fourth aspect, an embodiment of this application provides a method for authenticating an access network device. In the method, a transceiver module is configured to receive an authentication request sent by a terminal device. The transceiver module is further configured to send a first authentication request response corresponding to the authentication request to the terminal device, where the first authentication request response includes first time window information, the first time window information is used to indicate a time range in which the terminal device receives the first authentication request response, and a first time window indicated by the first time window information includes at least one transmission time unit.

In a replay attack, regardless of whether an illegal access network device modifies the first authentication request response, provided that the illegal access network device and an illegal terminal device intervene in communication between the terminal device and a legal access network device, a delay of two more air interface transmissions is necessarily introduced between the terminal device and the legal access network device. As a result, the first transmission time unit does not fall within the first time window. Therefore, according to such a solution, the terminal device can determine whether an access network device communicating with the terminal device is a legal access network device, and can determine whether the terminal device suffers a replay attack, so that communication security between the legal terminal device and the legal access network device can be ensured.

According to the fourth aspect, in a first implementation of the fourth aspect of the embodiments of this application, the transceiver module is further configured to receive a prompt message sent by the terminal device, where the prompt message is used to prompt the access network device that a first transmission time unit falls outside the first time window. The transceiver module is further configured to send a second authentication request response corresponding to the authentication request to the terminal device, where the second authentication request response includes second time window information, the second time window information is used to indicate a time range in which the terminal device receives the second authentication request response, and a second time window indicated by the second time window information includes at least one transmission time unit.

In this implementation, the access network device determines whether to send the second authentication request response corresponding to the authentication request, based on such a result that "the first transmission time unit falls outside the first time window" in an indication message sent by the terminal device. In this case, the access network device may send the second authentication request response to the terminal device, and the second authentication request response includes the second time window information. Such an implementation can avoid that the terminal device mistakenly considers a legal access network device as an illegal access network device due to an accidental factor such as a network delay.

According to the fourth aspect, in a second implementation of the fourth aspect of the embodiments of this application, the transceiver module is further configured to receive a prompt message sent by the terminal device, where the prompt message is used to indicate the access network device to send a second authentication request response corresponding to the authentication request to the terminal device, the second authentication request response includes second time window information, the second time window information is used to indicate a time range in which the terminal device receives the second authentication request response, and a second time window indicated by the second time window information includes at least one transmission time unit. The transceiver module is further configured to send the second authentication request response to the terminal device.

In this implementation, after the access network device receives the prompt message sent by the terminal device, the access network device also sends the second authentication request response to the terminal device. However, different from the prompt message that is described in the first implementation of the fourth aspect and that indicates such a result that "the first transmission time unit falls outside the first time window", the prompt message in this implementation indicates that the terminal device requires the access network device to send the second authentication request response to the terminal device. However, such an implementation can also avoid that the terminal device mistakenly considers a legal access network device as an illegal access network device due to an accidental factor such as a network delay.

According to the fourth aspect, the first implementation of the fourth aspect, or the second implementation of the fourth aspect, in a third implementation of the fourth aspect of the embodiments of this application, the authentication request includes third time window information, and the third time window information is used to indicate the access network device to determine a reference range of the first time window information or the second time window information. The communication device further includes a processing module, configured to determine the first time window information based on the third time window information.

This implementation provides another manner of determining the first time window information. In this implementation, the access network device may determine the first time window information with reference to the third time window information in the authentication request. Therefore, the first time window information determined by the access network device is more accurate, and accuracy of authenticating the access network device by the terminal device can be improved.

According to a fifth aspect, an embodiment of this application provides a communication device. The communication device may be a terminal device, or may be a chip in the terminal device. The communication device may include a processing module and a transceiver module. When the communication device is a terminal device, the processing module may be a processor, and the transceiver module may be a transceiver. The network device may further include a storage module, where the storage module may be a memory. The storage module is configured to store instructions, and the processing module executes the instructions stored in the storage module, to enable the terminal device to perform the method according to any one of the first aspect or the implementations of the first aspect. When the communication device is a chip in the terminal device, the processing module may be a processor, and the transceiver module may be an input/output interface, a pin, a circuit, or the like. The processing module executes instructions stored in a storage module, to enable the terminal device to perform the method in any one of the first aspect or the implementations of the first aspect. The storage module may be a storage module (for example, a register or a cache) in the chip, or may also be a storage module (for example, a read-only memory and a random access memory) outside the chip in the terminal device.

According to a sixth aspect, an embodiment of this application provides a communication device. The communication device may be an access network device, or may be a chip in the access network device. The communication device may include a processing module and a transceiver module. When the communication device is an access network device, the processing module may be a processor, and the transceiver module may be a transceiver. The access network device may further include a storage module, where the storage module may be a memory. The storage module is configured to store instructions, and the processing module executes the instructions stored in the storage module, to enable the access network device to perform the method according to any one of the second aspect or the implementations of the second aspect. When the communication device is a chip in the access network device, the processing module may be a processor, and the transceiver module may be an input/output interface, a pin, a circuit, or the like. The processing module executes instructions stored in a storage module, to enable the access network device to perform the method in any one of the second aspect or the implementations of the second aspect. The storage module may be a storage module (for example, a register or a cache) in the chip, or may also be a storage module (for example, a read-only memory and a random access memory) outside the chip in the access network device.

According to a seventh aspect, an embodiment of this application provides a communication system, including the terminal device according to any one of the third aspect or the implementations of the third aspect, and the access network device according to any one of the fourth aspect or the implementations of the fourth aspect, or including the terminal device according to the fifth aspect and the access network device according to the sixth aspect.

According to an eighth aspect, this application provides a communication apparatus. The apparatus may be an integrated circuit chip, configured to implement a function of the foregoing terminal device.

According to a ninth aspect, this application provides a communication apparatus. The apparatus may be an integrated circuit chip, configured to implement a function of the foregoing access network device.

According to a tenth aspect, an embodiment of this application provides a computer program product including instructions. When the computer program product runs on a computer, the computer is enabled to perform the method according to any one of the first aspect and the implementations of the first aspect, or any one of the second aspect and the implementations of the second aspect.

According to an eleventh aspect, an embodiment of this application provides a computer-readable storage medium, including instructions. When the instructions are run on a computer, the computer is enabled to perform the method according to any one of the first aspect and the implementations of the first aspect or any one of the second aspect and the implementations of the second aspect.

When a replay attack occurs, two more air interface transmissions between the terminal device and the access network device are introduced. As a result, a message sent by the access network device is delayed to be received by the terminal device. In the embodiments of this application, the access network device may indicate, by using the first authentication request response, the time range in which the terminal device receives the first authentication request response, that is, the time range in which the terminal device receives the first authentication request response when the terminal device does not suffer a replay attack. Therefore, if the first transmission time unit in which the terminal device receives the first authentication request response falls within the time range, that is, the first transmission time unit should fall within the first time window, it may be determined that the access network device communicating with the terminal device is a legal access network device. Therefore, the terminal device may determine that the terminal device does not suffer a replay attack.

BRIEF DESCRIPTION OF DRAWINGS

To describe technical solutions in embodiments of this application more clearly, the following briefly describes the accompanying drawings for describing the embodiments. It is clear that the accompanying drawings in the following descriptions show merely some embodiments of this application.

DESCRIPTION OF EMBODIMENTS

Embodiments of this application provide a method for authenticating an access network device and a related device, so that a terminal device can accurately determine whether an access network device is an illegal access network device.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

The following first describes system architectures and application scenarios of the method for authenticating an access network device provided in the embodiments of this application.

The solutions provided in the embodiments of this application are mainly applied to system architectures that use a radio frame structure for time synchronization, for example, a radio frame structure synchronization system based on long term evolution (LTE), a radio frame structure synchronization system based on a new air interface (NR) technology, or a radio frame structure synchronization system based on a subsequently evolved access standard. This is not specifically limited herein.

Figure 1:
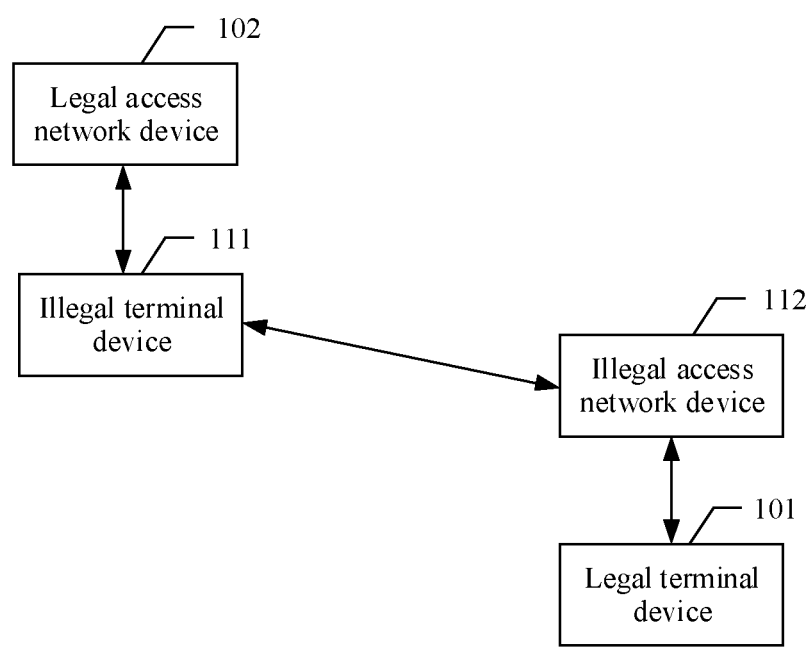
FIG. 1 is a diagram of a replay attack scenario according to an embodiment of this application.

Based on the foregoing system architectures, an application scenario to which the embodiments of this application are applicable is shown in FIG. 1. In this application scenario, a legal terminal device 101, a legal access network device 102, an illegal terminal device 111, and an illegal access network device 112 are included. The illegal access network device 112 may be an illegal base station or another transceiver apparatus that imitates a base station. By transmitting a high-quality and high-power radio signal, the illegal access network device 112 may attract the legal terminal device 101 to camp on or access. After the legal terminal device 101 performs camping-on or accessing, an uplink message sent by the legal terminal device 101 to the legal access network device 102 is intercepted by the illegal access network device 112. In this case, the illegal access network device 112 may forward the uplink message to the illegal terminal device 111, and then the illegal terminal device 111 sends the uplink message to the legal access network device 102. In this case, because the legal access network device 102 cannot detect an exception when receiving the uplink message, the legal access network device 102 responds to the uplink message and sends a downlink message to the legal terminal device 101. In this case, the illegal terminal device 111 receives the downlink message and forwards the downlink message to the illegal access network device 112, and then the illegal access network device 112 sends the downlink message to the legal terminal device 101. In this process, the illegal access network device 112 and the illegal terminal device 111 may cooperate with each other when stealing information exchanged between the legal terminal device 101 and the legal access network device 102 without being detected by the legal terminal device 101 and the legal access network device 102. Therefore, a security risk exists in the information exchange between the legal terminal device 101 and the legal access network device 102.

The method provided in the embodiments of this application may be applied to the foregoing scenario, so that the legal terminal device 101 determines whether an access network device that performs air interface data exchange with the legal terminal device 101 is the legal access network device 102, and further determines whether a replay attack exists between the legal terminal device 101 and the legal access network device 102. Therefore, information security of a communication process is ensured.

In this embodiment of this application, the legal terminal device 101 includes a device that provides voice and/or data connectivity for a user, for example, a handheld device having a wireless connection function, or a processing device connected to a wireless modem. The legal terminal device 101 may communicate with a core network through a radio access network (RAN), and exchange voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device, an access terminal device, a user terminal device, a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, an intelligent wearable device, or the like. For example, the terminal device is a device such as a personal communication service (PCS) phone, a cordless phone, a session initiation protocol (SIP) phone, a wireless local loop (WLL) station, or a personal digital assistant (PDA). The terminal device further includes a limited device, for example, a device having low power consumption, a device having a limited storage capability, or a device having a limited computing capability. In addition, in a 5G-based internet of vehicles (V2X) system, the legal terminal device 101 may alternatively be a vehicle-mounted terminal. In addition, the legal terminal device 101 may alternatively be a wearable device, such as glasses, gloves, watches, clothing, and shoes, or another portable device that may be directly worn on the body or integrated into clothes or accessories of the user. This is not specifically limited in this application.

It should be understood that the legal terminal device 101 in this embodiment of this application may be any one of the foregoing devices or chips. This is not specifically limited herein. Regardless of being used as a device or a chip, the legal terminal device 101 may be manufactured, sold, or used as an independent product. In this embodiment and subsequent embodiments, only the terminal device is used as an example for description.

In addition, the legal access network device 102 may be a radio access network (RAN) device, for example, a base station or an access point, or may be a device that communicates with a wireless terminal device through an air interface over one or more cells in an access network. The legal access network device 102 may be configured to perform mutual conversion between a received over-the-air frame and an internet protocol (IP) packet, and serve as a router between the terminal device and a remaining part of the access network. The remaining part of the access network may include an IP network. The legal access network device 102 may further coordinate attribute management of an air interface. For example, the legal access network device 102 may include an evolved NodeB (evolved NodeB, NodeB, eNB, or e-NodeB) in a long term evolution LTE system or an LTE-advanced (LTE-A) system, or a next generation NodeB (gNB) in a new radio (NR) system, or may include a centralized unit (CU) and a distributed unit (DU) in a cloud access network (Cloud RAN) system. This is not limited in this embodiment of this application.

It should be understood that the legal access network device 102 in this embodiment of this application may be any one of the foregoing devices or chips. This is not specifically limited herein. Regardless of being used as a device or a chip, the legal access network device 102 may be manufactured, sold, or used as an independent product. In this embodiment and subsequent embodiments, only the access network device is used as an example for description.

Figure 2A:
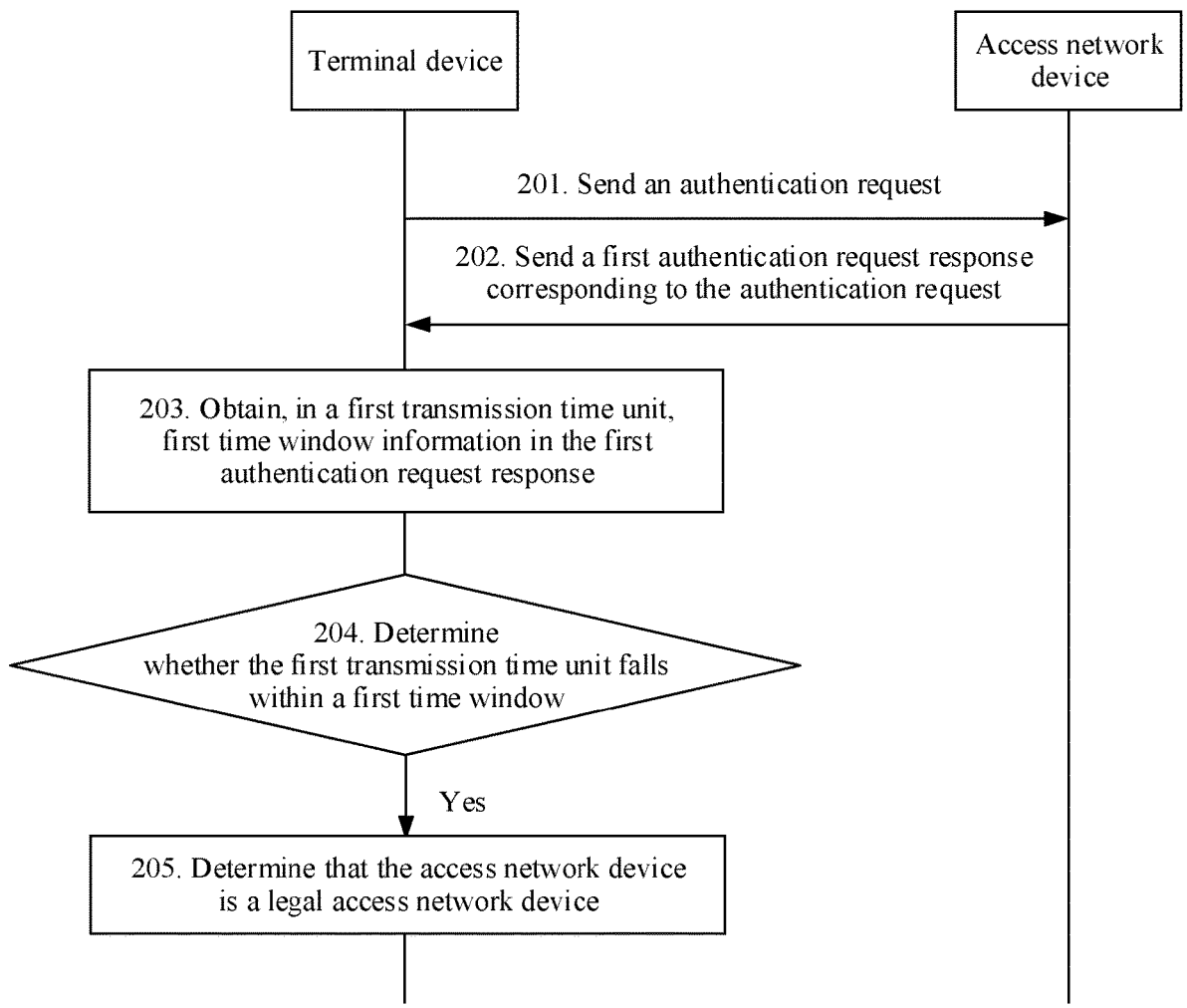
FIG. 2A is a flowchart of a method for authenticating an access network device according to an embodiment of this application.
Figure 2B:
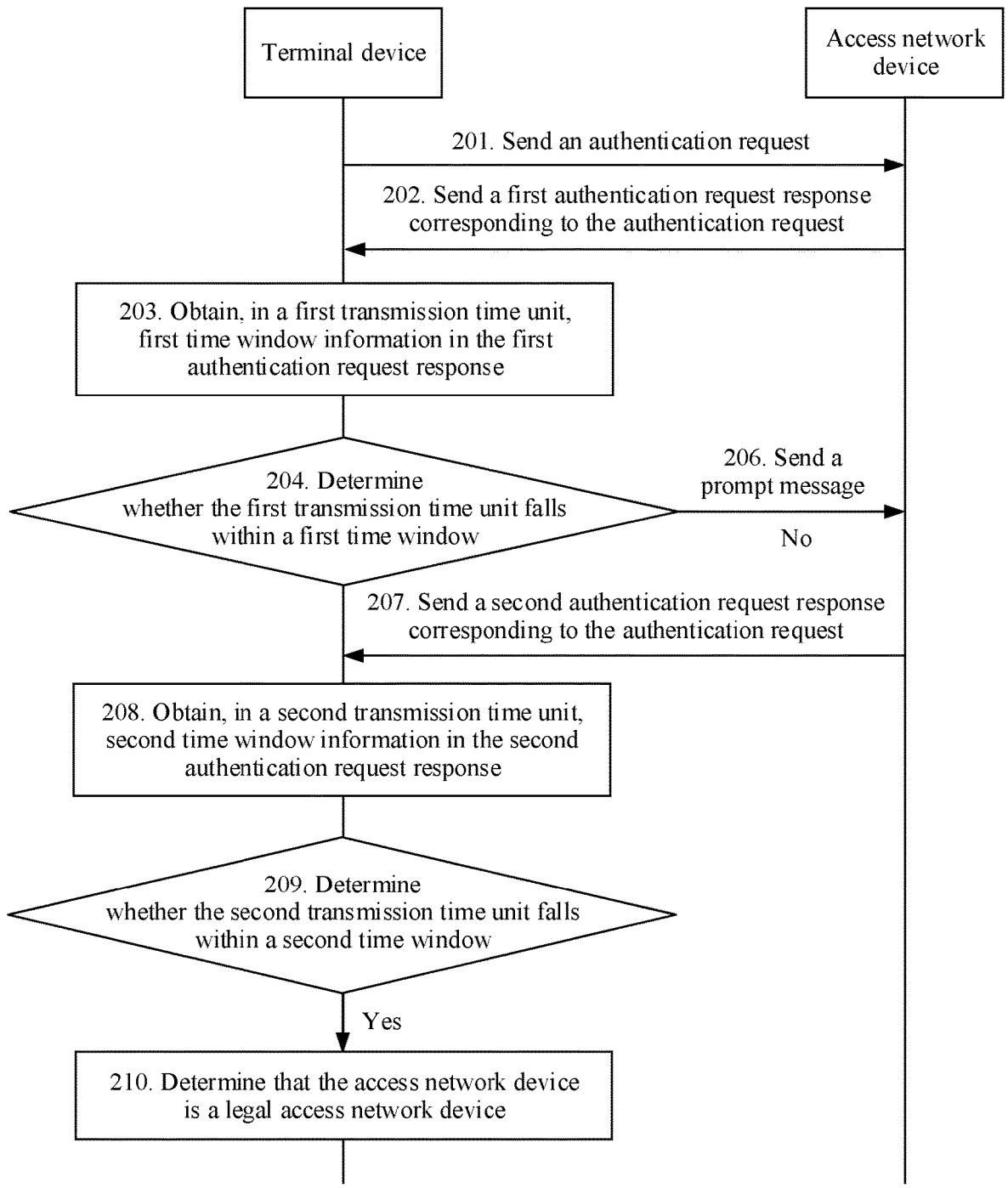
FIG. 2B is another flowchart of a method for authenticating an access network device according to an embodiment of this application.
Figure 2C:
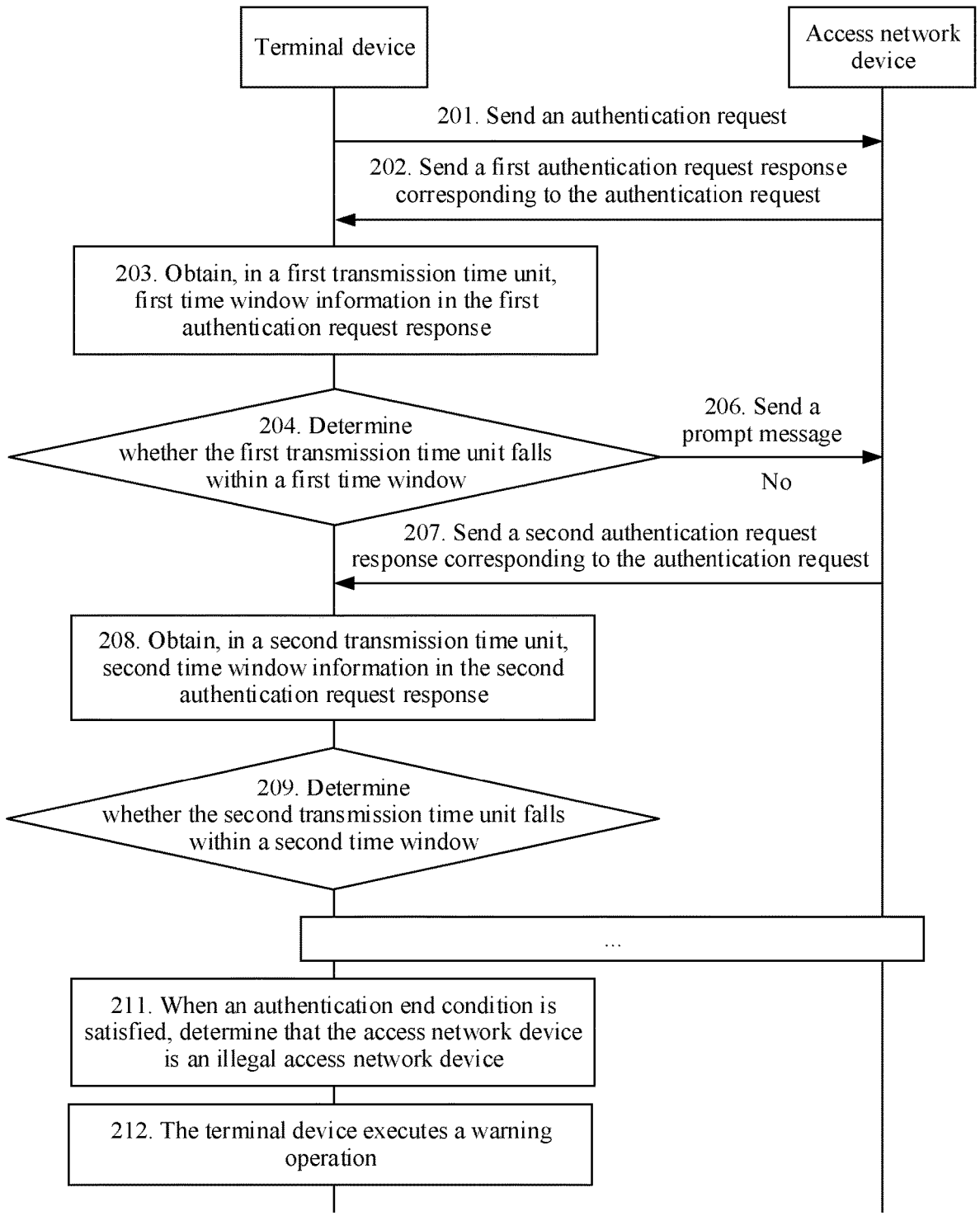
FIG. 2C is another flowchart of a method for authenticating an access network device according to an embodiment of this application.

For ease of understanding, the following describes a procedure of the method for authenticating an access network device based on the foregoing system architectures and the application scenarios. As shown in FIG. 2A, FIG. 2B, and FIG. 2C, the method includes the following steps.

201. A terminal device sends an authentication request to an access network device.

In this embodiment, after the terminal device accesses a network, the terminal device sends the authentication request to the access network device. After the terminal device initiates a random access procedure, the terminal device may trigger the operation of sending the authentication request to the access network device. Alternatively, after being handed over to an access network device, the terminal device may trigger the operation of sending the authentication request to the access network device. In addition, after a secondary carrier is added, the terminal device may trigger the operation of sending the authentication request to the access network device. This is not specifically limited herein.

Optionally, when the terminal device sends the authentication request, the terminal device starts an authentication timer. The authentication timer is used to record duration used for authenticating the access network device by the terminal device. It should be understood that when the authentication timer satisfies a stop condition, the authentication timer stops timing. The stop condition may be that the terminal device determines that the access network device is a legal access network device, or accumulated authentication duration recorded by the authentication timer reaches preset duration. The preset duration may be set based on a specific application scenario. In addition, the length of the preset duration may influence precision, a fault tolerance rate, and the like of authenticating the access network device by the terminal device, to satisfy authentication requirements in different scenarios.

202. The terminal device receives, in a first transmission time unit, a first authentication request response in response to the authentication request.

In this embodiment, if the access network device receives the authentication request sent by the terminal device, the access network device sends the first authentication request response in response to the authentication request to the terminal device. Therefore, the terminal device may receive the first authentication request response in response to the authentication request. However, the terminal device still cannot determine whether the first authentication request response is a first authentication request response that is intercepted, duplicated, and resent by an illegal access network device.

In addition, the transmission time unit has different meanings in different network architectures. For example, in new radio NR, the transmission time unit may be a slot, or may be a mini-slot. The slot is a radio common transmission time unit in NR. Based on different network configurations, the slot may have a length of 1 ms, 0.5 ms, 0.25 ms, or 0.125 ms. In addition, the mini-slot is a radio short transmission time unit in NR. The mini-slot is a part of the slot. In addition, in long term evolution LTE, the transmission time unit may be a short TTI). The TTI refers to the length of an independent decoding transmission on a radio link. In 3rd generation partnership project (3GPP) LTE and LTE-A standards, one TTI is 1 ms, that is, the size of one subframe. In a subsequently evolved standard, the transmission time unit may alternatively be represented by using another duration or symbol. This is not specifically limited herein.

The following describes the transmission time unit based on an NR network architecture. In the network architecture, a time domain resource includes a system frame, a subframe, a slot, and a symbol.

The length of the system frame is 10 ms, and a system frame number (SFN) ranges from 0 to 1023. Therefore, a period of one SFN is 1024*10 ms=10240 ms=10.24 seconds. The length of the subframe is 1 ms, and a subframe number ranges from 0 to 9. Each subframe is divided into two semi-subframes. A first semi-subframe includes subframes 0 to 4, and a second semi-subframe includes subframes 5 to 9. In addition, each subframe includes several slots. One slot includes 14 orthogonal frequency division multiplexing (OFDM) symbols, and a symbol in a slot ranges from 0 to 13.

It should be understood that the quantity of slots included in each system frame differs, and the quantity of slots included in each subframe differs. As shown in Table 1-1, $N_{symb}^{slot}$ is the quantity of symbols included in each slot, $N_{slot}^{frame,\mu}$ is the quantity of slots included in each radio frame, and $N_{slot}^{subframe,\mu}$ is the quantity of slots included in each subframe. Details are not described herein again.

TABLE 1-1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

It should be understood that if the terminal device does not receive the first authentication request response within long duration, the terminal device may trigger another authentication request, or the terminal device determines that the first authentication request response is intercepted by an illegal access network device.

203. The terminal device obtains, in the first transmission time unit, first time window information in the first authentication request response.

In this embodiment, after the terminal device receives the first authentication request response, the terminal device needs to decode the first authentication request response, to obtain the first time window information in the first authentication request response. Because normal decoding takes very short time, if the terminal device can normally perform decoding, it may be considered that the terminal device can obtain the first time window information in a same transmission time unit in which the terminal device receives the first authentication request response. In other words, the terminal device can obtain the first time window information in the first transmission time unit.

In actual application, due to a busy service of the terminal device or another factor, the terminal device may decode the first authentication request response after the first transmission time unit in which the first authentication request response is received. This is not specifically limited herein. Whenever the terminal device decodes the first authentication request response, after the terminal device successfully decodes the first authentication request response, the terminal device can obtain the first time window information in the first authentication request response.

In this embodiment, the first time window information is used to indicate a time range in which the terminal device receives the first authentication request response, that is, a time range in which the terminal device should receive the first authentication request response when the terminal device does not suffer a replay attack and the access network device is a legal access network device. Therefore, if a moment at which the terminal device receives the first authentication request response exactly falls within a first time window indicated by the first time window information, the terminal device may determine that the access network device is a legal access network device.

It should be noted that the first time window indicated by the first time window information includes at least one transmission time unit. In actual application, the quantity of transmission time units included in the first time window may be adjusted based on a security degree required by a user. For example, when the user has a high requirement for communication security, the first time window may be set to include only one transmission time unit. When network quality is poor or a network delay is introduced, the first time window may be set to include two or more transmission time units. This is not specifically limited herein. In addition, it should be further understand that the quantity of transmission time units included in the first time window may be set by the access network device. This is not specifically limited herein.

In this embodiment, the first time window information may indicate the first time window in the following representation manner:

In a feasible implementation, the first time window information includes a first start point of the first time window and a first end point of the first time window. The first start point is used to indicate a transmission time unit corresponding to an earliest moment that is determined by the access network device and at which the terminal device receives the first authentication request response, that is, a transmission time unit corresponding to a moment at which the terminal device should receive the first authentication request response when the terminal device does not suffer a replay attack and there is no obvious network delay. Generally, the first start point may be the transmission time unit corresponding to the moment at which the access network device sends the first authentication request response. The first end point is used to indicate a transmission time unit corresponding to a latest moment that is determined by the access network device and at which the terminal device receives the first authentication request response, that is, a transmission time unit corresponding to a latest moment at which the terminal device is allowed by the access network device to receive the first authentication request response after the access network device considers a network delay. Generally, the access network device may adjust the first end point based on network congestion or an authentication precision requirement, to adapt to requirements of different application scenarios.

Figure 3A:
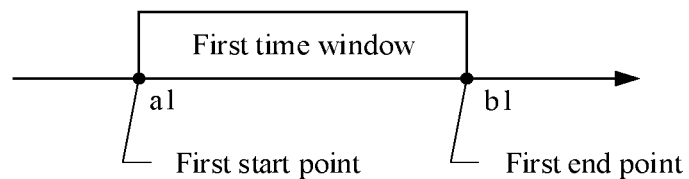
FIG. 3A is a diagram of an embodiment of a first time window in a method for authenticating an access network device according to an embodiment of this application.
Figure 3B:
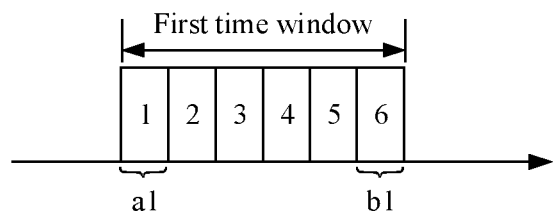
FIG. 3B is a diagram of another embodiment of a first time window in a method for authenticating an access network device according to an embodiment of this application.

It should be understood that, given two known points, a time period between the two points can be determined. Therefore, the first start point and the first end point can define an exact time range. For ease of understanding, FIG. 3A is used as an example for description. The first time window information includes a first start point a1 and a first end point b1. The first time window information may be represented as "{a1; b1}". Therefore, it may be determined that the first time window is a time period from a1 to b1, and the first time window indicated by the first time window information is [a1, b1]. Further, an example in which the transmission time unit is a slot in an SFN in a period is used for description. The first time window information may be "{first period, a radio SFN symbol is 1, a radio slot symbol is 1; first period, a radio SFN symbol is 1, a radio slot symbol is 6}". In this case, the first time window indicated by the first time window information is shown in FIG. 3B. The first time window indicated by the first time window information is [(first period, a radio SFN symbol is 1, a radio slot symbol is 1), (first period, a radio SFN symbol is 1, a radio slot symbol is 6)]. The first time window includes six slots: "first period, a radio SFN symbol is 1, a radio slot symbol is 1", "first period, a radio SFN symbol is 1, a radio slot symbol is 2", "first period, a radio SFN symbol is 1, a radio slot symbol is 3", "first period, a radio SFN symbol is 1, a radio slot symbol is 4", "first period, a radio SFN symbol is 1, a radio slot symbol is 5", and "first period, a radio SFN symbol is 1, a radio slot symbol is 6". Therefore, the first transmission time unit, that is, a slot in which the first authentication request response is successfully received and is decoded, may be any one of the foregoing six slots. When the first transmission time unit is any one of the foregoing six slots, the terminal device may determine that the access network device is a legal access network device.

In another feasible implementation, the first time window information includes a first start point of the first time window and first recommended duration of the first time window. The first start point is used to indicate a transmission time unit corresponding to an earliest moment that is determined by the access network device and at which the terminal device receives the authentication request response, that is, a transmission time unit corresponding to a moment at which the terminal device should receive the authentication request response when the terminal device does not suffer a replay attack and there is no obvious network delay. Similar to the foregoing implementation, the first start point may be the transmission time unit corresponding to the moment at which the access network device sends the first authentication request response. The first recommended duration is used to indicate the length of the first time window. The length of the first time window may be adjusted by the access network device based on network congestion. This is not specifically limited herein.

Figure 3C:
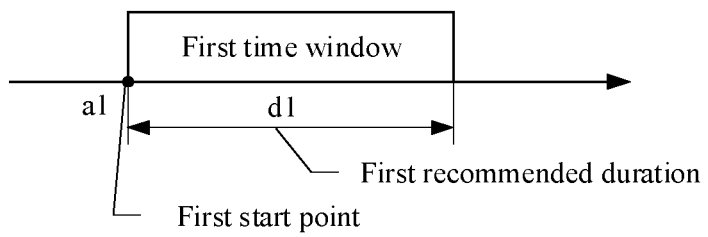
FIG. 3C is a diagram of another embodiment of a first time window in a method for authenticating an access network device according to an embodiment of this application.
Figure 3D:
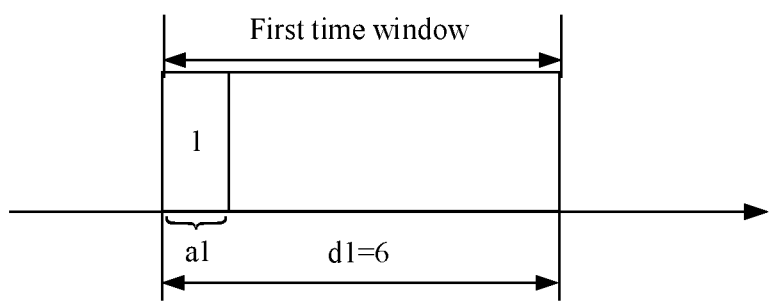
FIG. 3D is a diagram of another embodiment of a first time window in a method for authenticating an access network device according to an embodiment of this application.

It should be understood that, although the first suggested duration is relative metrics, because the first start point is an absolute transmission time unit, and a left end point of the first recommended duration is the first start point, the first start point and the first recommended duration can define an exact time range. For ease of understanding, FIG. 3C is used as an example for description. The first time window information includes a first start point a1 and first recommended duration d1. The first time window information may be represented as "{a1; d1}". The first recommended duration d1 includes the first start point a1. Therefore, it may be determined that the first time window is [a1, (a1+d1−1)]. Further, an example in which the transmission time unit is a slot in an SFN in a period is still used for description. For ease of understanding a difference between a representation manner of the first time window information in this implementation and the representation manner of the first time window in the foregoing embodiment, the following describes an example in which the same first time window is indicated. The first time window information may be "{first period, a radio SFN symbol is 1, a radio slot symbol is 1; six slots}". In this case, the first time window indicated by the first time window information is shown in FIG. 3D. The first time window includes six slots, which are "first period, a radio SFN symbol is 1, a radio slot symbol is 1" and the following five slots. Therefore, the first transmission time unit, that is, a slot in which the first authentication request response is successfully received and is decoded, may be any one of the foregoing six slots. When the first transmission time unit is any one of the foregoing six slots, the terminal device may determine that the access network device is a legal access network device.

Figure 3E:
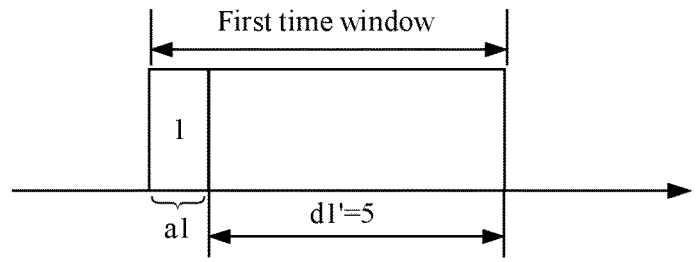
FIG. 3E is a diagram of another embodiment of a first time window in a method for authenticating an access network device according to an embodiment of this application.

In this implementation, it may also be defined: first recommended duration d1' does not include the first start point a1. As shown in FIG. 3E, the first time window information may be "{first period, a radio SFN symbol is 1, a radio slot symbol is 1; five slots}". Therefore, it may be determined that the first time window is [a1, (a1+d1')], and the first time window still includes six slots, that is, "first period, a radio SFN symbol is 1, a radio slot symbol is 1" and the following five slots. Details are similar to the foregoing descriptions, and are not described herein again.

Figure 4A:
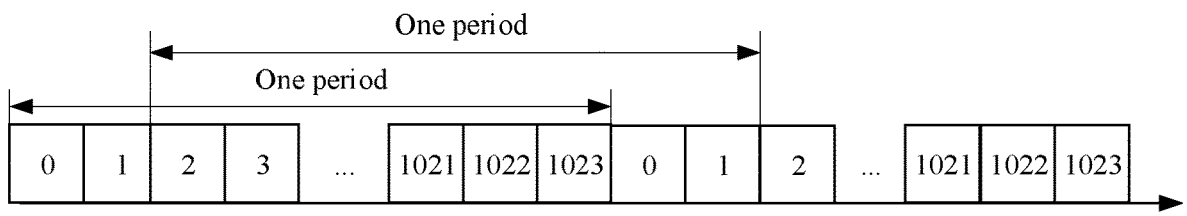
FIG. 4A is a diagram of another embodiment of a first time window in a method for authenticating an access network device according to an embodiment of this application.

It should be understood that the period in the foregoing two implementations refers to a period of an SFN symbol. As shown in FIG. 4A, because an SFN symbol ranges from 0 to 1023, the length of one period is 1024 SFN symbols. The first period refers to a period formed by symbols from an SFN symbol corresponding to a moment that is determined by the access network device and at which the access network device receives the authentication request, to the following 1023 SFN symbols. The SFN symbol is an absolute value, and the access network device may receive the authentication request in any SFN symbol from 0 to 1023. Therefore, a start point of the foregoing period may be any SFN symbol from 0 to 1023. In other words, a total of 1024 SFN symbols from 0 to 1023 may be one period, and a total of 1024 SFN symbols from 2 to 1023 and 0 and 1 may be one period. This is not specifically limited herein.

For ease of understanding, description is provided with reference to the implementations corresponding to FIG. 3A and FIG. 3B.

This embodiment describes an example in which a total of 1024 SFN symbols from 0 to 1023 are used as one period. The first time window information may be directly represented by a period sequence number, a quantity of SFN symbols, and a quantity of slot symbols. For example, it is defined: the first time window information includes six variables. The first three variables respectively represent a period sequence number, a quantity of SFN symbols, and a quantity of slot symbols of the first start point. The last three variables respectively represent a period sequence number, a quantity of SFN symbols, and a quantity of slot symbols of the first end point. The period sequence number may be defined by the access network device. For example, the period sequence number is 1, that is, first period, which represents a period formed by an SFN symbol corresponding to a moment at which the access network device receives the authentication request and the following 1023 SFN symbols.

Figure 4B:
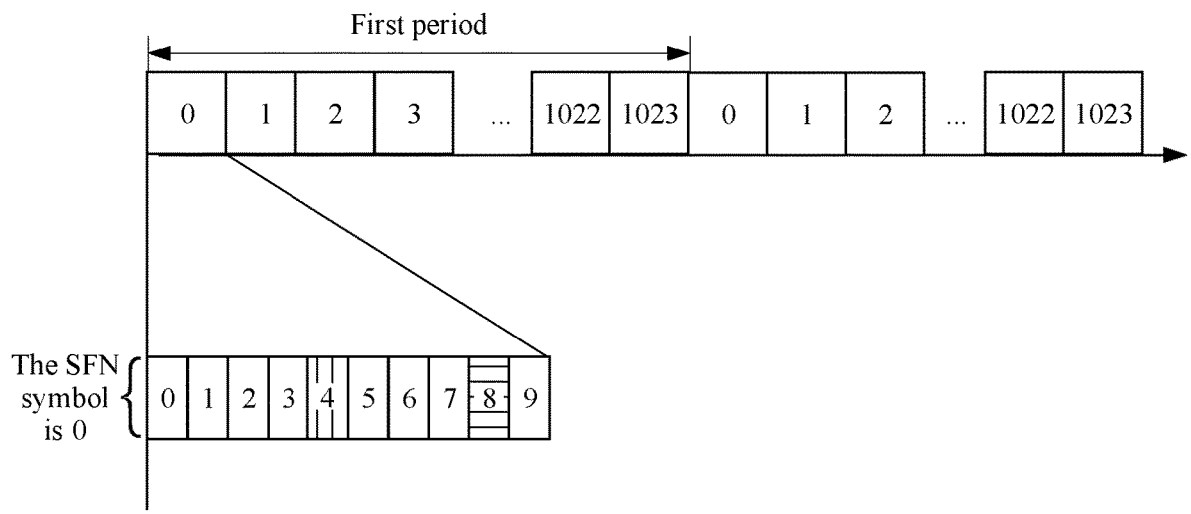
FIG. 4B is a diagram of another embodiment of a first time window in a method for authenticating an access network device according to an embodiment of this application.

For ease of understanding, FIG. 4B is used as an example for description. The first time window information may be represented as "{1, 0, 4; 1, 0, 8}". the first start point of the first time window is a slot (that is, a part shaded by vertical lines in FIG. 4B) whose slot symbol is 4 in an SFN whose SFN symbol is 0 in the first period, and the first end point of the first time window is a slot (that is, a part shaded by horizontal lines in FIG. 4B) whose slot symbol is 8 in an SFN whose SFN symbol is 0 in the first period. In this case, the first time window includes five slots.

This embodiment describes an example in which a total of 1024 SFN symbols including 1022, 1023, and 0 to 1021 are used as one period. In the example shown in FIG. 4C, the quantity of SFN symbols of the first start point is different from the quantity of SFN symbols of the first end point. The first time window information may be represented as "{1, 0, 4; 1, 3, 1}". The first start point of the first time window is a slot (that is, a part shaded by vertical lines in FIG. 4C) whose slot symbol is 4 in an SFN whose SFN symbol is 0 in the first period, and the first end point of the first time window is a slot (that is, a part shaded by horizontal lines in FIG. 4C) whose slot symbol is 1 in an SFN whose SFN symbol is 3 in the first period. In this case, the first time window includes 28 slots.

Figure 4C:
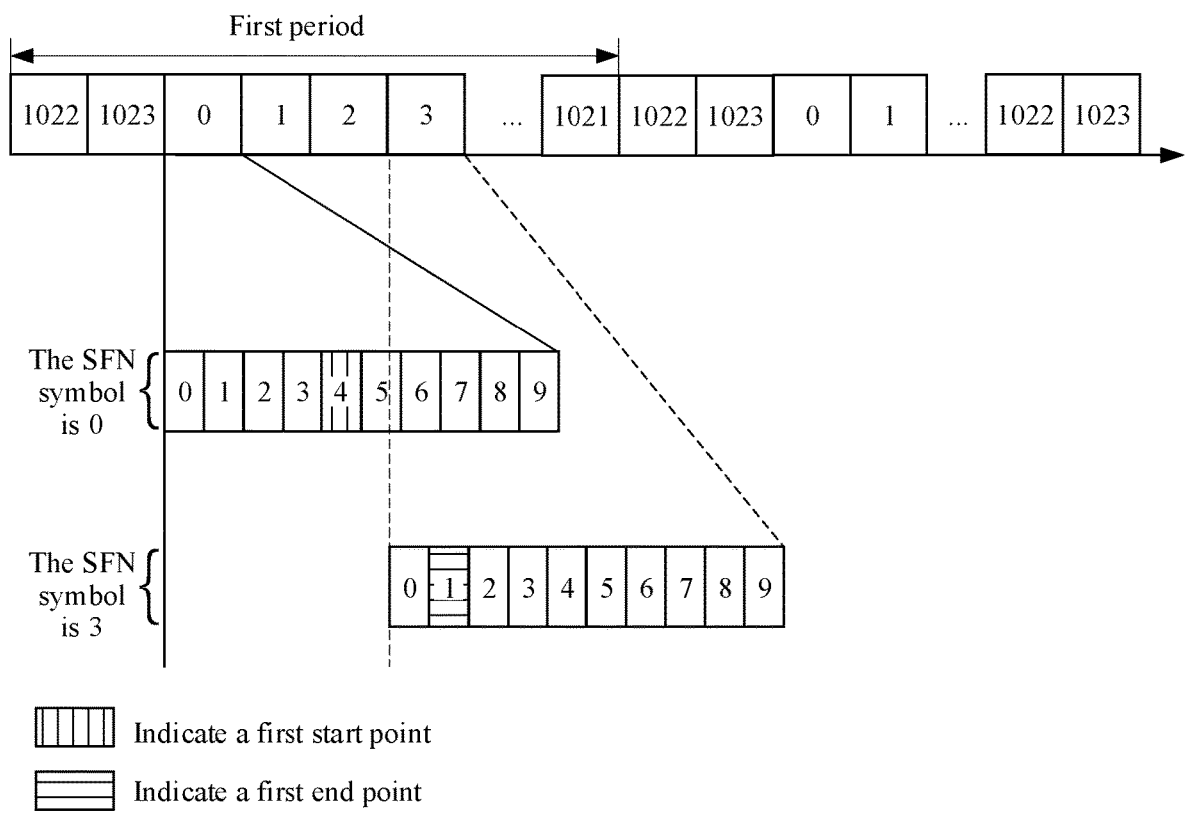
FIG. 4C is a diagram of another embodiment of a first time window in a method for authenticating an access network device according to an embodiment of this application.
Figure 4D:
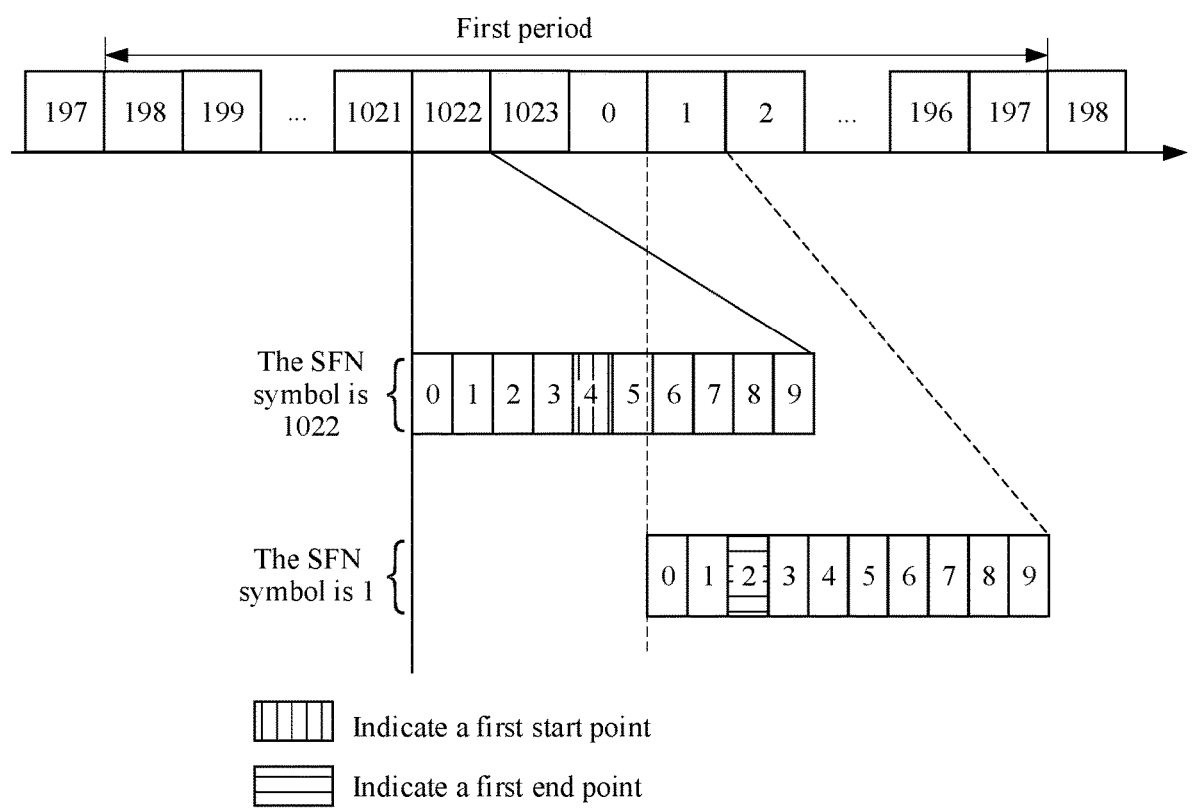
FIG. 4D is a diagram of another embodiment of a first time window in a method for authenticating an access network device according to an embodiment of this application.

In addition, it should be further noted that, as shown in FIG. 4D, when the access network device receives the authentication request in a slot in an SFN whose SFN symbol is 198 in the left of FIG. 4D, the access network device may define: a total of 1024 SFN symbols from 198 to 1023 and from 0 to 197 is the first period. In this case, the first time window information may be represented as "{1, 1022, 4; 1, 1, 2}". The first start point of the first time window is a slot (that is, a part shaded by vertical lines in FIG. 4D) whose slot symbol is 4 in an SFN whose SFN symbol is 1022, and the first end point of the first time window is a slot (that is, a part shaded by horizontal lines in FIG. 4D) whose slot symbol is 2 in an SFN whose SFN symbol is 1. In this case, the first time window includes 29 slots.

It should be understood that the first time windows shown in FIG. 4A, FIG. 4C, and FIG. 4D are merely used as examples for description, and no limitation is imposed on the first time window. In actual application, the first start point and the first end point may alternatively be represented in another manner. This is not specifically limited herein.

Similarly, the foregoing implementations corresponding to FIG. 3C and FIG. 3D are used as examples for description.

Optionally, the first time window information may be directly represented by a quantity of SFN symbols or a quantity of slot symbols. For example, it is defined: the first time window information includes four variables. The first three variables respectively represent a period sequence number, a quantity of SFN symbols of the first start point, and a quantity of slot symbols. The last variable represents first recommended duration, that is, a quantity of slots included in the first time window.

Figure 4E:
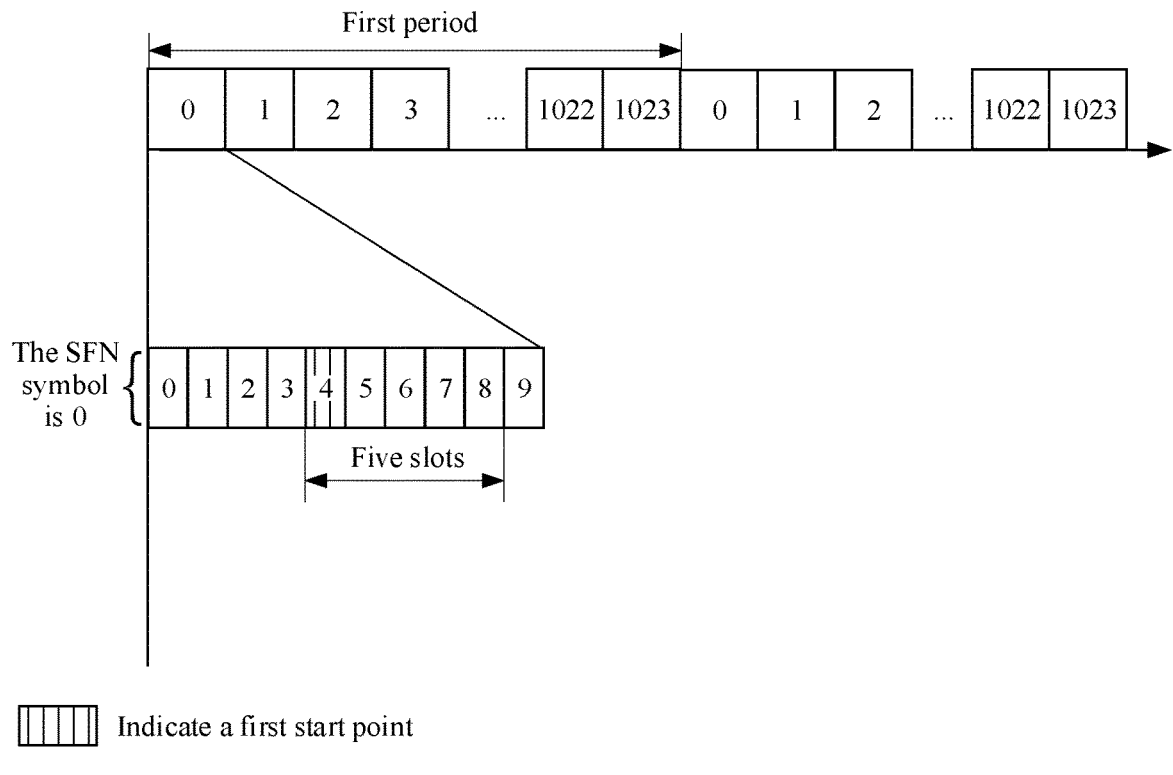
FIG. 4E is a diagram of another embodiment of a first time window in a method for authenticating an access network device according to an embodiment of this application.

As shown in FIG. 4E, the first time window information may be represented as "{1, 0, 4; 5}". The first start point of the first time window is a slot (that is, a part shaded by vertical lines in FIG. 4E) whose slot symbol is 4 in an SFN whose SFN symbol is 0 in the first period, and the first recommended duration of the first time window is five slots. In this case, the first slot in the five slots is the first start point.

It should be understood that the first time window shown in FIG. 4E is merely used as an example for description, and no limitation is imposed on the first time window. In actual application, the first start point and the first recommended duration may alternatively be represented in another manner. This is not specifically limited herein.

It should be understood that the access network device may use any one of the foregoing implementations to represent the first time window. This is not specifically limited herein. However, it should be noted that a representation manner of the first time window is similar to a representation manner of the second time window below, and details are not described herein.

In this embodiment, if the terminal device performs a plurality of retransmissions when sending the authentication request to the access network device in step 201, or the terminal device performs a plurality of retransmissions when receiving the first authentication request response in response to the authentication request in step 202, when the access network device determines the first time window information, the access network device should prevent the first time window from overlapping a time range corresponding to a preconfigured value. Details are described below.

Figure 4F:
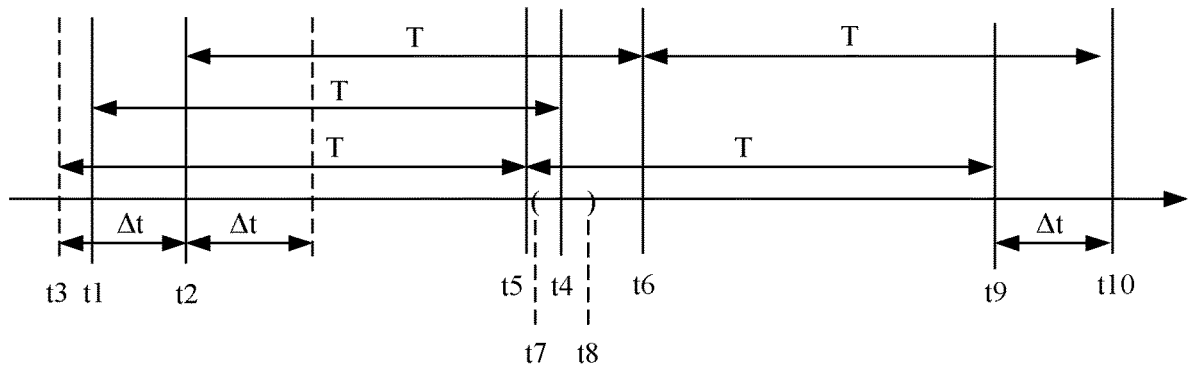
FIG. 4F is a diagram of another embodiment of a first time window in a method for authenticating an access network device according to an embodiment of this application.

As shown in FIG. 4F, t1 is a transmission time unit corresponding to a moment at which the terminal device starts to send the authentication request, t2 is a transmission time unit corresponding to a moment at which the access network device successfully receives the authentication request, [t1, t2] is duration that a plurality of retransmissions of the authentication request lasts, Δt is maximum duration from sending the authentication request by the terminal device to receiving the authentication request by the access network device, and Δt is a preconfigured value and is used to indicate maximum retransmission time that is allowed. Therefore, when the access network device receives, in the transmission time unit corresponding to the moment t2, the authentication request sent by the terminal device, the access network device may determine that an earliest moment at which the terminal device sends the authentication request is t3, that is, t3=t2−Δt. Therefore, the access network device may infer that a moment at which the terminal device first sends the authentication request is a transmission time unit corresponding to any moment in [t3, t2]. If a period is calculated from the moment at which the terminal device sends the authentication request, the period is t1 to t4, and the length is T=1024 SFN symbols, that is, 10.24 seconds. If a period is calculated from the moment at which the access network device successfully receives the authentication request, the period is t2 to t6, and the length is T=1024 SFN symbols, that is, 10.24 seconds. Therefore, a period range determined by the access network device is inconsistent with a period range determined by the terminal device, causing ambiguity. For example, if the first time window is [t7, t8], the access network device considers that the first start point t7 and the first end point t8 are within a same period. However, because the period range determined by the terminal device is [t1, t4], the terminal device considers that the first start point t7 and the first end point t8 fall within different periodicities, that is, the terminal device considers that duration between t7 and t8 is at least greater than 10.24 seconds. Therefore, to avoid ambiguity, when determining the first time window information, the access network device should prevent the first time window from falling within a range from t5 to t6, that is, prevent the first time window from falling within [t5, t6]. In addition, a synchronization mechanism of a radio frame structure is that every 10.24 seconds are a cycle. Therefore, the first time window should be prevented from falling within [t5+10.24n, t6+10.24n]. n is an integer greater than or equal to 0. For example, when n=1, [t5+10.24n, t6+10.24n] is [t5+10.24, t6+10.24], that is, [t9, t10]. The rest can be obtained by analogy, and details are not described herein. Optionally, Δt is configured by the access network device, and may be obtained by the terminal device from a system message before an authentication process starts, or may be obtained by the terminal device from another dedicated signaling before an authentication process starts. This is not specifically limited herein.

In this embodiment, after the terminal device obtains the first time window information in the first authentication request response in the first transmission time unit, the terminal device performs step 204.

204. The terminal device determines whether the first transmission time unit falls within the first time window.

For details, refer to the related descriptions in step 203.

In this embodiment, when the terminal device determines that the first transmission time unit falls within the first time window, as shown in FIG. 2A, the terminal device performs step 205. When the terminal device determines that the first transmission time unit falls outside the first time window, as shown in FIG. 2B, and the terminal device cannot certainly determine that the access network device is an illegal access network device, the terminal device performs step 206 and step 207.

205. The terminal device determines that the access network device is a legal access network device.

In this embodiment, when the terminal device determines that the first transmission time unit falls within the first time window, the terminal device determines that the access network device is a legal access network device.

Optionally, in step 201, if the terminal device starts the authentication timer when the terminal device sends the authentication request, when the terminal device determines that the access network device is a legal access network device, the terminal device controls the authentication timer to stop timing.

206. The terminal device sends a prompt message to the access network device.

In this embodiment, when the terminal device determines that the first transmission time unit falls outside the first time window, the terminal device sends the prompt message to the access network device.

In a feasible implementation, the prompt message is used to prompt the access network device that the first transmission time unit falls outside the first time window. In this implementation, the prompt message serves only a prompt function, and the following operation is determined by the access network device.

In another feasible implementation, the prompt message is used to indicate the access network device to send a second authentication request response to the terminal device. In this implementation, the terminal device indicates, based on such a determining result that "the first transmission time unit falls outside the first time window", the access network device to send the second authentication request response to the terminal device. Therefore, in this case, the terminal device determines whether to send the second authentication request response.

207. The terminal device receives, in a second transmission time unit, the second authentication request response in response to the authentication request.

In this embodiment, regardless of whether the access network device determines to send the second authentication request response to the terminal device based on the determining result of the terminal device, or the access network device sends the second authentication request response to the terminal device based on an indication of the terminal device, the terminal device may receive, in the second transmission time unit, the second authentication request response in response to the authentication request. The second authentication request response includes second time window information, the second time window information is used to indicate a time range in which the terminal device receives the second authentication request response, and a second time window indicated by the second time window information includes at least one transmission time unit.

It should be understood that a time range indicated by the second time window information is different from the range indicated by the first time window information. The first time window information is determined by the access network device based on the transmission time unit corresponding to the moment at which the access network device receives the authentication request sent by the terminal device. The second time window information is determined by the access network device based on the transmission time unit corresponding to the moment at which the access network device receives the prompt message sent by the terminal device.

However, a representation manner of the second time window information is similar to the representation manner of the first time window information, and details are not described herein again.

208. The terminal device obtains, in the second transmission time unit, the second time window information in the second authentication request response.

This step is similar to the foregoing step 202, and details are not described herein again.

209. The terminal device determines whether the second transmission time unit falls within the second time window.

In this embodiment, when the terminal device determines that the second transmission time unit falls within the second time window, as shown in FIG. 2B, the terminal device performs step 210. When the terminal device determines that the second transmission time unit falls outside the second time window, as shown in FIG. 2C, the terminal device performs step 211.

210. The terminal device determines that the access network device is a legal access network device.

In this embodiment, although the first transmission time unit falls within the first time window, because the second transmission time unit falls within the second time window, the terminal device determines that the access network device is a legal access network device.

Optionally, if the terminal device starts the authentication timer when the terminal device sends the authentication request in step 201, and the accumulated authentication duration recorded by the authentication timer does not reach the preset duration, when the terminal device determines that the second transmission time unit falls within the second time window, that is, when the terminal device determines that the access network device is a legal access network device, the terminal device controls the authentication timer to stop timing.

211. When the terminal device determines that the second transmission time unit falls outside the second time window, and an authentication end condition is satisfied, the terminal device determines that the access network device is an illegal access network device.

When the terminal device determines that the second transmission time unit falls outside the second time window, the terminal device sends a prompt message again to the access network device, and receives a third authentication request response or the like that is sent by the access network device and that corresponds to the authentication request. This step is similar to step 206 to step 209, and details are not described herein again. It should be understood that, to prevent the terminal device from constantly sending a prompt message and receiving an authentication request response corresponding to the authentication request, or to avoid that the terminal device is affected in performing another service, the terminal device determines that the access network device is an illegal access network device when the authentication end condition is satisfied.

When any one of the following cases occurs, the terminal device may determine that the authentication end condition is satisfied.

In a feasible implementation, the terminal device may determine, based on duration indicated by the foregoing authentication timer, that the authentication end condition is satisfied. The authentication timer is an authentication timer started when the terminal device sends the authentication request in step 201. In an authentication process, if the terminal device does not determine that the access network device is a legal access the network device, the authentication timer remains in a timing state until the duration indicated by the authentication timer is greater than the preset authentication duration, and then the terminal device determines that the access network device is an illegal access network device.

In such an implementation, the authentication process may be limited to an appropriate time range, thereby avoiding that the authentication process occupies excessively long time. In addition, when the illegal access network device duplicates and forwards a message exchanged between the terminal device and the legal access network device, a large delay is introduced. Therefore, the preset authentication duration should be less than the delay introduced by the illegal access network device, to ensure accuracy of the authentication process.

In another feasible implementation, the terminal device records accumulated authentication duration, where the accumulated authentication duration is duration from sending the authentication request by the terminal device to receiving the authentication request response corresponding to the authentication request by the terminal device, where the authentication request response includes a first authentication request response or a second authentication request response. Timing starts when the terminal device sends the authentication request to the access network device. Each time the terminal device receives the authentication request response, the terminal device records the accumulated authentication duration once. When the accumulated authentication duration is greater than the preset authentication duration, the terminal device determines that the access network device is an illegal access network device. In this implementation, the terminal device can adjust the preset authentication duration based on a plurality of pieces of accumulated authentication duration, so that the preset authentication duration is set to be more accurate.

There is still another feasible implementation. In this implementation, the terminal device records an accumulated quantity of authentication times, where the accumulated quantity of authentication times is a quantity of times that a moment at which the terminal device receives an authentication request response falls outside a time window corresponding to the authentication request response. When the accumulated quantity of authentication times is greater than a preset quantity of authentication times, the terminal device determines that the access network device is an illegal access network device. In this implementation, the terminal device may adjust the preset quantity of authentication times based on the accumulated quantity of authentication times, to control duration or accuracy of the authentication process.

It should be understood that the terminal device may use one or more of the foregoing plurality of authentication end conditions. This is not specifically limited herein. However, when the terminal device uses at least two of the foregoing authentication end conditions at the same time, as the authentication process proceeds, when an authentication end condition is satisfied or the terminal device determines that the access network device is a legal access network device, the authentication process ends. It should be further noted that an authentication end condition used by the terminal device is preconfigured by the access network device. Optionally, the terminal device may determine a type of a to-be-used authentication end condition based on system information broadcast by the access network device, or may obtain the type of the to-be-used authentication end condition from signaling sent by the access network device to the terminal device. This is not specifically limited herein.

212. When the terminal device determines that the access network device is an illegal access network device, the terminal device performs a warning operation.

In this implementation, when the terminal device determines that the access network device is an illegal access network device, the terminal device may actively disconnect from the illegal access network device, and start searching for another access network device that can provide a service for the terminal device. This is not specifically limited herein.

In this embodiment, the access network device may indicate, by using the first authentication request response, the time range in which the terminal device receives the first authentication request response, that is, the time range in which the terminal device receives the first authentication request response when the terminal device does not suffer a replay attack. Therefore, if the first transmission time unit in which the terminal device receives the first authentication request response falls within the time range, that is, the first transmission time unit should fall within the first time window, it may be determined that the access network device communicating with the terminal device is a legal access network device. Therefore, the terminal device may determine that the terminal device does not suffer a replay attack.

In some feasible embodiments, in step 201, the authentication request may include third time window information, and the third time window information is used to indicate the access network device to determine a reference range of the first time window information or the second time window information. That is, the access network device may determine the first time window information or the second time window information based on the third time window information in the authentication request. A representation manner of the third time window information is similar to the representation manner of the first time window information in step 203, and details are not described herein again.

In addition, it should be further understand that the terminal device may determine the third time window information based on an indication of a system message. Before the terminal device sends the authentication request to the access network device, that is, before step 201, the terminal device may receive a system message sent by the access network device. The system message includes fourth recommended duration. The fourth recommended duration is used to indicate the terminal device to determine the length of the third time window indicated by the third time window information. Therefore, the terminal device may determine the third time window information based on the fourth recommended duration.

In this embodiment, because the first time window determined by the access network device may be determined by the access network device based on the third time window information in the authentication request sent by the terminal device, compared with the first time window information directly determined by the access network device, the first time window information determined by the access network device based on the third time window information of the terminal device is more accurate, so that efficiency of an entire authentication process can be improved.

Figure 5:
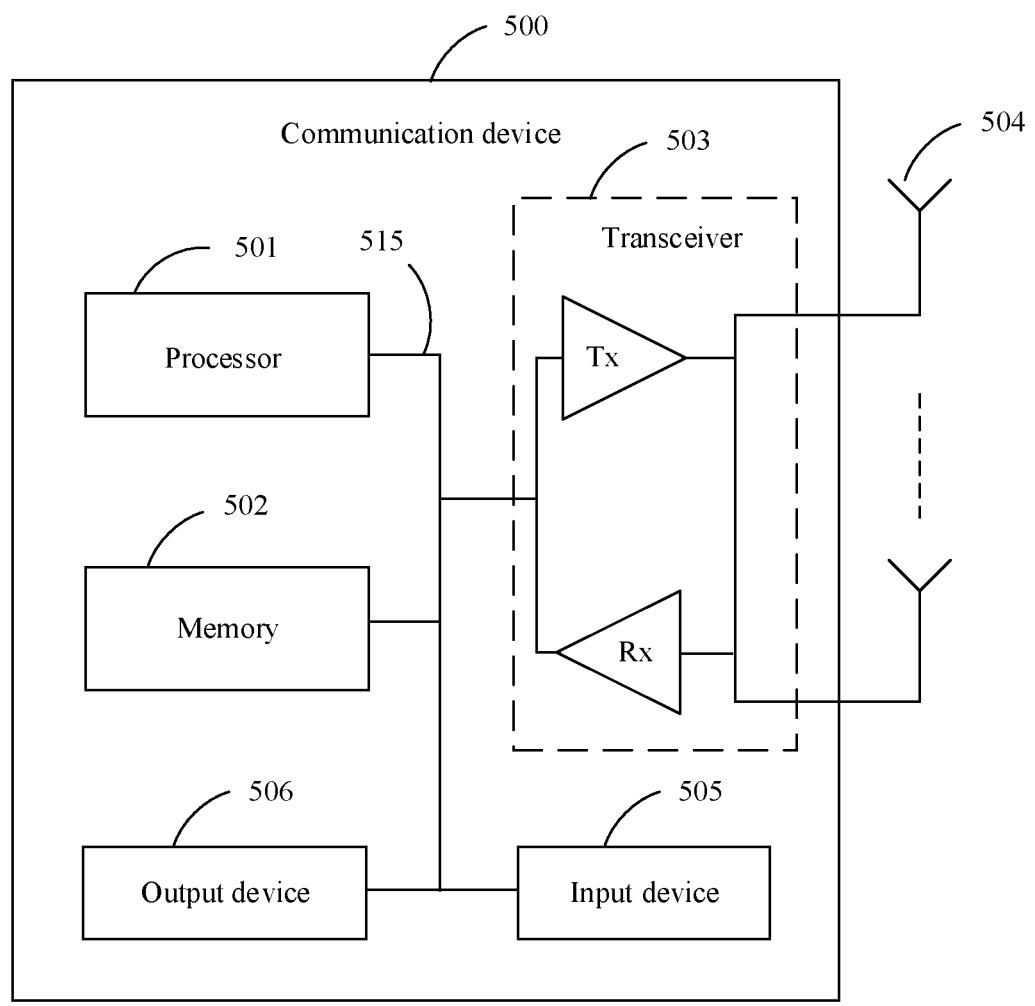
FIG. 5 is a diagram of an embodiment of a communication device according to an embodiment of this application.

As shown in FIG. 5, an embodiment provides a diagram of a structure of another communication device 500. It should be understood that the terminal device in the method embodiments corresponding to FIG. 2A, FIG. 2B, and FIG. 2C may be based on the structure of the communication device 500 shown in FIG. 5 in this embodiment.

The communication device 500 includes at least one processor 501, at least one memory 502, and at least one transceiver 503. The processor 501, the memory 502, and the transceiver 503 are connected by a bus or communication link 515. Optionally, the communication device 500 may further include an input device 505, an output device 506, and one or more antennas 504. The antenna 504 is connected to the transceiver 503, and the input device 505 and the output device 506 are connected to the processor 501.

In this embodiment, the memory 502 is mainly configured to store a software program and data. The memory 502 may exist independently, and is connected to the processor 501. Optionally, the memory 502 and the processor 501 may be integrated, for example, integrated into one or more chips. The memory 502 can store program code for executing the technical solutions in the embodiments of this application, and the processor 501 controls the execution. Various types of executed computer program code may also be considered as drivers of the processor 501. It should be understood that FIG. 5 in this embodiment shows only one memory and one processor. However, during actual application, the communication device 500 may have a plurality of processors or a plurality of memories. This is not specifically limited herein. In addition, the memory 502 may also be referred to as a storage medium, a storage device, or the like. The memory 502 may be a storage element located on a same chip as the processor, namely, an on-chip storage element, or an independent storage element. This is not limited in the embodiments of this application.

In this embodiment, the transceiver 503 may be configured to support receiving or sending of a radio frequency signal between the communication device 500 and an access network device, and the transceiver 503 may be connected to the antenna 504. The transceiver 503 includes a transmitter Tx and a receiver Rx. The one or more antennas 504 may receive a radio frequency signal. The receiver Rx of the transceiver 503 is configured to: receive the radio frequency signal from the antenna 504, convert the radio frequency signal into a digital baseband signal or a digital intermediate frequency signal, and provide the digital baseband signal or the digital intermediate frequency signal for the processor 501, so that the processor 501 further processes, for example, demodulates or decodes, the digital baseband signal or the digital intermediate frequency signal. In addition, the transmitter Tx in the transceiver 503 is further configured to receive a modulated digital baseband signal or digital intermediate frequency signal from the processor 501, convert the modulated digital baseband signal or digital intermediate frequency signal into a radio frequency signal, and send the radio frequency signal through the one or more antennas 504. The receiver Rx may selectively perform one-level or multi-level down-mixing processing and analog-to-digital conversion processing on a radio frequency signal to obtain a digital baseband signal or a digital intermediate frequency signal, and a sequence of the down-mixing processing and the analog-to-digital conversion processing is adjustable. The transmitter Tx may selectively perform one-level or multi-level up-mixing processing and digital-to-analog conversion processing on a modulated digital baseband signal or digital intermediate frequency signal to obtain a radio frequency signal, and a sequence of the up-mixing processing and the digital-to-analog conversion processing is adjustable. The digital baseband signal and the digital intermediate frequency signal may be collectively referred to as a digital signal.

It should be understood that the transceiver 503 may also be referred to as a transceiver unit, a transceiver, a transceiver apparatus, or the like. Optionally, a component that is in the transceiver unit and configured to implement a receiving function may be considered as a receiving unit. A component that is in the transceiver unit and configured to implement a sending function may be considered as a sending unit. That is, the transceiver unit includes the receiving unit and the sending unit. The receiving unit may also be referred to as a receiver, an input port, a receiving circuit, or the like. The sending unit may be referred to as a transmitter, a transmitter circuit, or the like.

The processor 501 may be a baseband processor, or may be a central processing unit (CPU). The baseband processor and the CPU may be integrated together or separated. The processor 501 may be configured to implement various functions for the terminal device, for example, configured to process a communication protocol and communication data, or configured to: control the entire terminal device, execute a software program, and process data of the software program, or configured to assist in completing a computing processing task, for example, graphics and image processing or audio processing. Alternatively, the processor 501 is configured to implement one or more of the foregoing functions.

In addition, the output device 506 communicates with the processor 501, and may display information in a plurality of manners. For example, the output device 506 may be a liquid crystal display (LCD), a light emitting diode (LED) display device, a cathode ray tube (CRT) display device, or a projector. The input device 505 communicates with the processor 501, and may receive an input from a user in a plurality of manners. For example, the input device 505 may be a mouse, a keyboard, a touchscreen device, or a sensor device.

Figure 6:
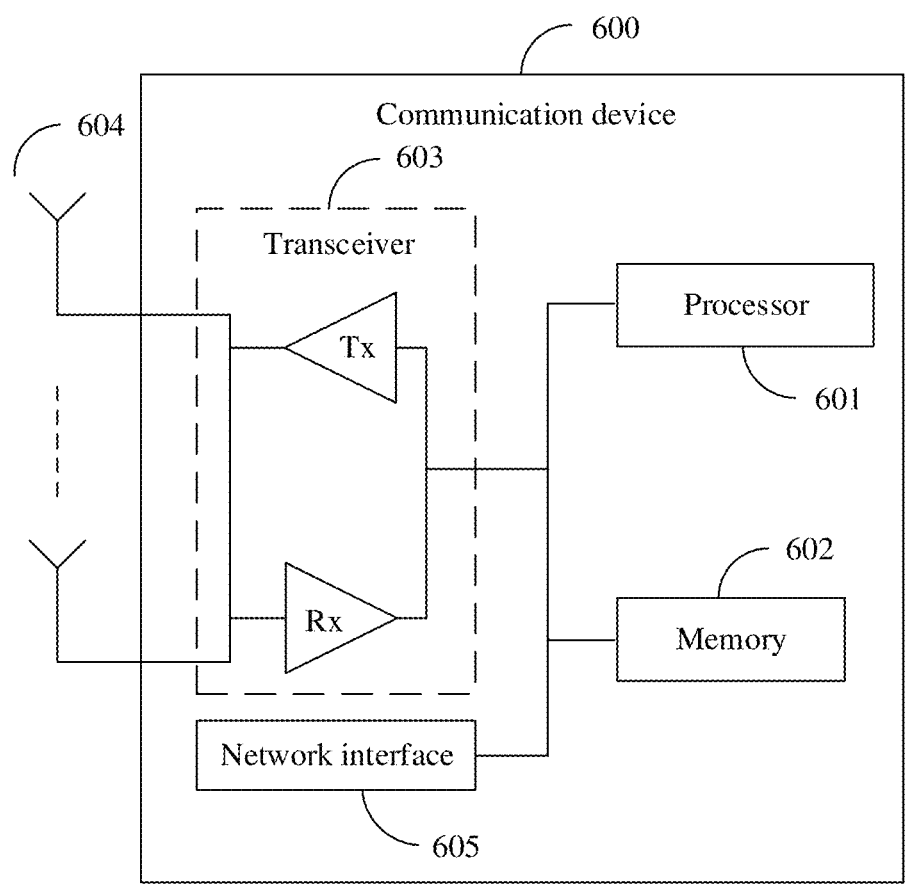
FIG. 6 is a diagram of another embodiment of a communication device according to an embodiment of this application.

As shown in FIG. 6, an embodiment provides a diagram of a structure of a communication device 600. It should be understood that the access network device in the method embodiments corresponding to FIG. 2A, FIG. 2B, and FIG. 2C may be based on the structure of the communication device 600 shown in FIG. 6 in this embodiment. It should be further understand that, when an access network device or a base station of a subsequently evolved standard performs the method in the embodiments of this application, the access network or the base station of the subsequently evolved standard may alternatively use the structure of the communication device 600 shown in FIG. 6 in this embodiment.

The communication device 600 includes at least one processor 601, at least one memory 602, at least one transceiver 603, at least one network interface 605, and one or more antennas 604. The processor 601, the memory 602, the transceiver 603, and the network interface 605 are connected by a connection apparatus, such as a bus or communication link 615, and the antenna 604 is connected to the transceiver 603. The connection apparatus may include various types of interfaces, transmission cables, buses, or the like. This is not limited in this embodiment.

The network interface 605 is configured to connect the communication device 600 to another communication device through a communication link. The network interface 605 may include a network interface between the communication device 600 and a core network element, for example, an S1 interface. The network interface 605 may alternatively include a network interface between the communication device 600 and another network device (for example, another access network device or core network element), for example, an X2 or Xn interface.

For the transceiver 603, the memory 602, and the antenna 604, refer to related descriptions of the transceiver 503, the memory 502, and the antenna 504 in the embodiment corresponding to FIG. 5. Details are not described herein again.

In addition, the processor 601 is mainly configured to process a communication protocol and communication data, control an entire network device, execute a software program, and process data of the software program, for example, configured to support the communication device 600 in performing an action described in the foregoing method embodiment. The communication device 600 may include a baseband processor and a central processing unit. The baseband processor is mainly configured to process the communication protocol and the communication data. The central processing unit is mainly configured to control the entire communication device 600, execute the software program, and process the data of the software program. Functions of the baseband processor and the central processing unit may be integrated into the processor 601 in FIG. 6. Persons skilled in the art may understand that the baseband processor and the central processing unit each may be an independent processor, and are interconnected by using a technology such as a bus. Persons skilled in the art may understand that the communication device 600 may include a plurality of baseband processors to adapt to different network standards, the communication device 600 may include a plurality of central processing units to improve a processing capability of communication device 600, and parts of the communication device 600 may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

Figure 7:
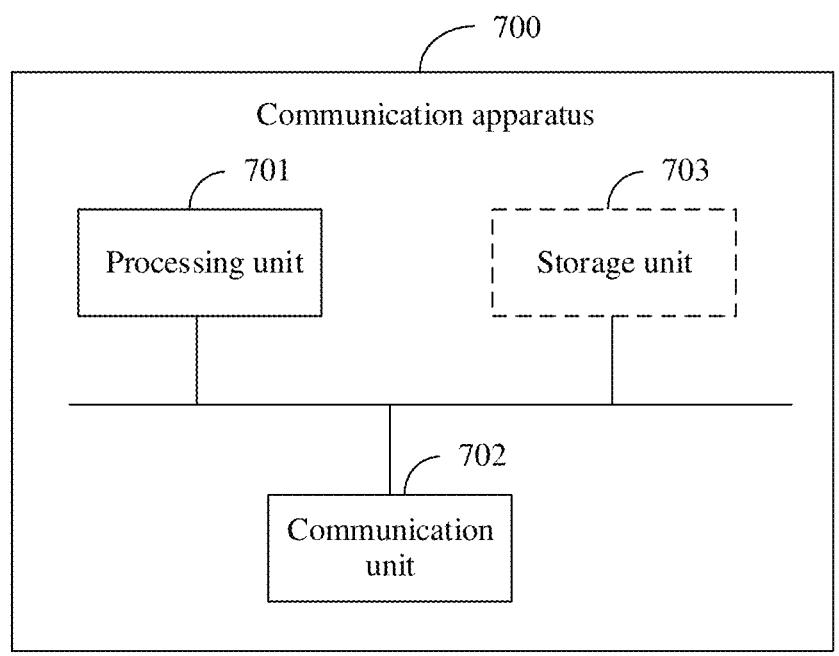
FIG. 7 is a diagram of an embodiment of a communication apparatus according to an embodiment of this application.

As shown in FIG. 7, an embodiment provides another communication apparatus 700. The communication apparatus 700 may be a terminal device or a chip in the terminal device.

When the communication apparatus 700 is a terminal device, for a diagram of a structure of the communication apparatus 700, refer to the structure of the communication device 500 shown in FIG. 5. Optionally, a communication unit 702 of the communication apparatus 700 may include an antenna and a transceiver of the communication device 500, for example, the antenna 504 and the transceiver 503 in FIG. 5.

When the communication apparatus 700 is a chip in the terminal device in this embodiment of this application, the communication unit 702 may be an input or output interface, a pin, a circuit, or the like. The storage unit 703 may be a register, a cache, a random access memory (RAM), or the like, and the storage unit 703 may be integrated with the processing unit 701. The storage unit 703 may be a read-only memory (ROM) or another type of static storage device that may store static information and instructions, and the storage unit 703 may be independent of the processing unit 701. When the communication apparatus 700 is a network device or a chip in the network device, the processing unit 701 can complete the method performed by the terminal device in the foregoing embodiments.

In an embodiment, the processing unit 701 may include instructions. The instructions may be run on a processor, to enable the communication apparatus 700 to perform the method performed by the access network device in the foregoing embodiments.

In an embodiment, the storage unit 703 stores instructions. The instructions may be run on the processing unit 701, to enable the communication apparatus 700 to perform the method performed by the terminal device in the foregoing embodiments. Optionally, the storage unit 703 may further store data. Optionally, the processing unit 701 may further store instructions and/or data.

When the communication apparatus 700 is a chip in the terminal device, the communication unit 702 or the processing unit 701 may perform the following steps.

For example, the communication unit 702 may send an authentication request to an access network device.

For example, the communication unit 702 may receive, in a first transmission time unit, a first authentication request response in response to the authentication request, and the processing unit 701 may obtain first time window information in the first authentication request response.

For example, when the first transmission time unit falls within a first time window, the processing unit 701 may determine that the access network device is a legal access network device.

For other parts, refer to the method performed by the terminal device in the foregoing embodiments. Details are not described herein again.

Figure 8:
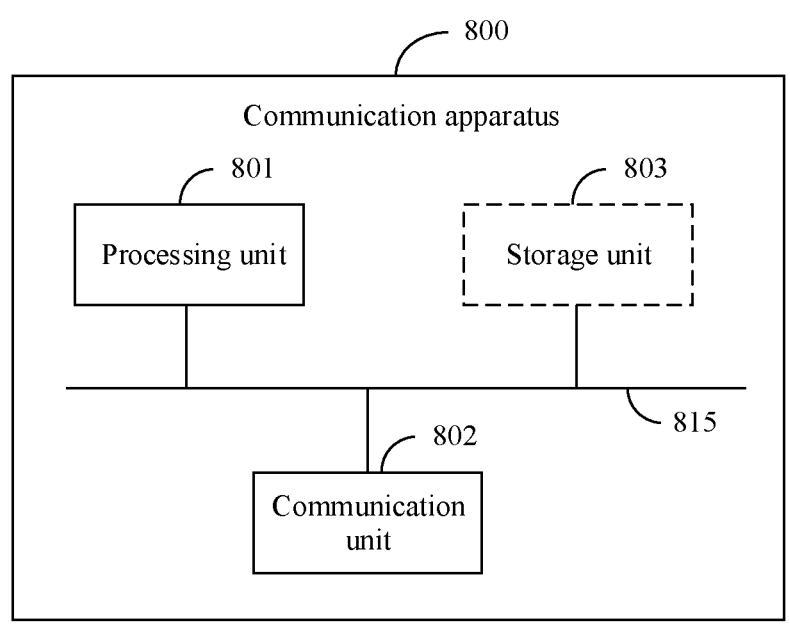
FIG. 8 is a diagram of another embodiment of a communication apparatus according to an embodiment of this application.

As shown in FIG. 8, an embodiment provides another communication apparatus 800. The communication apparatus 800 may be an access network device or a chip in the access network device.

When the communication apparatus 800 is an access network device, for a diagram of a structure of the communication apparatus 800, refer to the structure of the communication device 600 shown in FIG. 6. Optionally, a communication unit 802 of the communication apparatus 800 may include an antenna and a transceiver of the communication device 80, for example, the antenna 604 and the transceiver 603 in FIG. 6. Optionally, the communication unit 802 may further include a network interface, for example, the network interface 605 in FIG. 6.

When the communication apparatus 800 is a chip in the access network device in this embodiment of this application, the communication unit 802 may be an input or output interface, a pin, a circuit, or the like. A storage unit 803 may be a register, a cache, a RAM, or the like, and the storage unit 803 may be integrated with a processing unit 801. The storage unit 803 may be a ROM or another type of static storage device that can store static information and instructions, and the storage unit 803 may be independent of the processing unit 801. When the communication apparatus 800 is a chip in the access network device, the processing unit 801 can complete the method performed by the access network device in the foregoing embodiments.

In an embodiment, the processing unit 801 may include instructions. The instructions may be run on a processor, to enable the communication apparatus 800 to perform the method performed by the access network device in the foregoing embodiments.

In an embodiment, the storage unit 803 stores instructions. The instructions may be run on the processing unit 801, to enable the communication apparatus 800 to perform the method performed by the access network device in the foregoing embodiments. Optionally, the storage unit 803 may further store data. Optionally, the processing unit 801 may further store instructions and/or data.

When the communication apparatus 800 is a chip in the access network device, the communication unit 802 or the processing unit 801 may perform the following steps.

For example, the communication unit 802 may receive N pieces of data channel quality information, and the processing unit 801 may determine, based on the N pieces of data channel quality information, one of N candidate network devices as a target network device.

For example, the communication unit 802 may receive an authentication request sent by a terminal device, and send a first authentication request response corresponding to the authentication request to the terminal device.

For example, the communication unit 802 may receive a prompt message sent by the terminal device, and send a second authentication request response corresponding to the authentication request to the terminal device.

For example, the processing unit 801 may determine first time window information based on third time window information.

For other parts, refer to the method performed by the access network device in the foregoing embodiments. Details are not described herein again.

It should be understood that the terminal device may include a function unit (means) corresponding to a step of the method or procedure performed by the terminal device, and the network device may include a function unit corresponding to a step of the method or procedure performed by the network device. One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures.

The processor in this application may include but is not limited to at least one of the following: various computing devices that run software, for example, a central processing unit CPU, a microprocessor, a digital signal processor (DSP), a microcontroller unit (MCU), or an artificial intelligence processor. Each computing device may include one or more cores for executing software instructions to perform calculation or processing. The processor may be a separate semiconductor chip, or may be integrated with another circuit to form a semiconductor chip. For example, the processor may be integrated with another circuit (such as a codec circuit, a hardware acceleration circuit, or various buses and interface circuits) to form a system-on-a-chip (SoC), or may be used as a built-in processor of an application-specific integrated circuit (ASIC) and integrated into the ASIC. The ASIC integrated with the processor may be separately encapsulated, or may be encapsulated together with another circuit. The processor includes a core configured to execute software instructions to perform calculation or processing, and may further include a necessary hardware accelerator, for example, a field programmable gate array (FPGA), a programmable logic device (PLD), or a logic circuit that implements a special-purpose logic operation.

The memory in this embodiment of this application may include at least one of the following types: a read-only memory ROM or another type of static storage device that can store static information and instructions, or a random access memory RAM or another type of dynamic storage device that can store information and instructions. The memory may alternatively be an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited herein.

In addition to a data bus, the bus may further include a power bus, a control bus, a status signal bus, and the like. However, for clear description, various types of buses in the figures are marked as the bus.

In an implementation process, steps in the foregoing methods can be implemented by using a hardware integrated logical circuit in the processor, or by using instructions in a form of software. The steps of the methods disclosed with reference to the embodiments of this application may be directly performed and completed by a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor. To avoid repetition, details are not described herein.

According to the method provided in the embodiments of this application, an embodiment of this application further provides a communication system, including the foregoing one or more communication devices and one or more communication apparatuses.

It should be further understood that, "first", "second", "third", "fourth", and various numbers in this specification are merely used for differentiation for ease of description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution orders in various embodiments of this application. The execution orders of the processes should be determined based on functions and internal logic of the processes, and should not be construed as any limitation on the implementation processes of the embodiments of this application.

A person of ordinary skill in the art may be aware that, various illustrative logical blocks (illustrative logical blocks) and steps (steps) that are described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for authenticating an access network device, comprising:
    sending, by a terminal device, an authentication request to the access network device;
    receiving, by the terminal device in a first transmission time interval, a first authentication request response in response to the authentication request, wherein the first authentication request response includes first time window information indicating a time range in which the terminal device receives the first authentication request response;
    obtaining the first time window information in the first authentication request response, wherein a first time window indicated by the first time window information comprises at least one transmission time interval; and
    determining, by the terminal device, that the access network device is a legal access network device when the terminal device determines that the first transmission time interval falls within the first time window.

2. The method according to claim 1, further comprising:
sending, by the terminal device, a prompt message to the access network device when the terminal device determines that the first transmission time interval falls outside the first time window, the prompt message prompting the access network device that the first transmission time interval falls outside the first time window; and
receiving, by the terminal device in a second transmission time interval, a second authentication request response in response to the authentication request, the second authentication request response comprising second time window information, the second time window information indicating a time range in which the terminal device receives the second authentication request response, and a second time window indicated by the second time window information comprises at least one transmission time interval.

3. The method according to claim 1, further comprising:
sending, by the terminal device, a prompt message to the access network device when the terminal device determines that the first transmission time interval falls outside the first time window, the prompt message indicating the access network device is to send a second authentication request response to the terminal device, the second authentication request response comprising second time window information, the second time window information indicating a time range in which the terminal device receives the second authentication request response, and a second time window indicated by the second time window information comprises at least one transmission time interval; and
receiving, by the terminal device in a second transmission time interval, the second authentication request response in response to the authentication request.

4. The method according to claim 2, wherein when the terminal device receives, in the second transmission time interval, the second authentication request response in response to the authentication request, the method further comprises:
obtaining, by the terminal device in the second transmission time interval, the second time window information in the second authentication request response; and
determining, by the terminal device, that the access network device is a legal access network device when the terminal device determines that the second transmission time interval falls within the second time window.

5. The method according to claim 1, further comprising:
starting, by the terminal device, an authentication timer when the terminal device sends the authentication request; and
determining, by the terminal device, that the access network device is an illegal access network device when a duration indicated by the authentication timer is greater than a preset authentication duration.

6. The method according to claim 2, further comprising:
recording, by the terminal device, an accumulated quantity of authentication times, the accumulated quantity of authentication times comprising a quantity of times the terminal device receives an authentication request response that falls outside a time window corresponding to the authentication request response; and
determining, by the terminal device, that the access network device is an illegal access network device when the accumulated quantity of authentication times is greater than a preset quantity of authentication times.

7. The method according to claim 6, the first time window information comprising a first start point of the first time window and a first end point of the first time window, the first start point indicating a transmission time interval corresponding to an earliest moment that is determined by the access network device and at which the terminal device receives the authentication request response, and the first end point indicating a transmission time interval corresponding to a latest moment that is determined by the access network device and at which the terminal device receives the authentication request response.

8. The method according to claim 6, the first time window information comprising a first start point of the first time window and a first recommended duration of the first time window, the first start point indicating a transmission time interval corresponding to an earliest moment that is determined by the access network device and at which the terminal device receives the authentication request response, and the first recommended duration indicating a first time window length.

9. The method according to claim 3, the authentication request comprising third time window information, and the third time window information indicating the access network device is to determine a reference range of the first time window information or the second time window information.

10. The method according to claim 9, wherein before the sending, by the terminal device, the authentication request to the access network device, the method further comprises:
receiving, by the terminal device, a system message sent by the access network device, the system message comprising a fourth recommended duration; and
determining, by the terminal device, the third time window information based on the fourth recommended duration.

11. A communication device, comprising:
a processor;
a memory coupled to the processor, the memory comprising instructions that, when executed by the processor, cause the communication device to:
send an authentication request to an access network device;
receive, in a first transmission time interval, a first authentication request response in response to the authentication request, wherein the first authentication request response includes first time window information indicating a time range in which the communication device receives the first authentication request response;
obtain the first time window information in the first authentication request response, wherein a first time window indicated by the first time window information comprises at least one transmission time interval; and
determine that the access network device is a legal access network device when the communication device determines that the first transmission time interval falls within the first time window.

12. The communication device according to claim 11, wherein the instructions, when executed by the processor, cause the communication device to:
send a prompt message to the access network device when the communication device determines that the first transmission time interval falls outside the first time window, the prompt message prompting the access network device that the first transmission time interval falls outside the first time window; and receive, in a second transmission time interval, a second authentication request response in response to the authentication request, the second authentication request response comprising second time window information, the second time window information indicating a time range in which the communication device receives the second authentication request response, and a second time window indicated by the second time window information comprises at least one transmission time interval.

13. The communication device according to claim 12, wherein the instructions, when executed by the processor, cause the communication device to:
send a prompt message to the access network device when the communication device determines that the first transmission time interval falls outside the first time window, the prompt message indicating the access network device is to send a second authentication request response to the communication device, the second authentication request response comprising second time window information, the second time window information indicating a time range in which the communication device will receive the second authentication request response, and a second time window indicated by the second time window information comprises at least one transmission time interval; and
receive, in the second transmission time interval, the second authentication request response in response to the authentication request.

14. The communication device according to claim 12, wherein the instructions, when executed by the processor, cause the communication device to:
obtain, in the second transmission time interval, the second time window information in the second authentication request response; and
determine that the access network device is a legal access network device when the communication device determines that the second transmission time interval falls within the second time window.

15. The communication device according to claim 12, wherein the instructions, when executed by the processor, cause the communication device to:
start an authentication timer when the communication device sends the authentication request; and
determine that the access network device is an illegal access network device when a duration indicated by the authentication timer is greater than a preset authentication duration.

16. The communication device according to claim 12, wherein the instructions, when executed by the processor, cause the communication device to:
record an accumulated quantity of authentication times, wherein the accumulated quantity of authentication times comprising a quantity of times the communication device receives an authentication request response that falls outside a time window corresponding to the authentication request response; and
determine that the access network device is an illegal access network device when the accumulated quantity of authentication times is greater than a preset quantity of authentication times.

17. A communication device, comprising:
a processor;
a memory coupled to the processor, the memory comprising instructions that, when executed by the processor, cause the communication device to:
receive an authentication request sent by a terminal device; and
send a first authentication request response to the terminal device in response to the authentication request, the first authentication request response comprising first time window information indicating a time range in which the terminal device receives the first authentication request response, and a first time window indicated by the first time window information comprises at least one transmission time interval,
wherein the instructions, when executed by the processor, further cause the communication device to:
receive a prompt message sent by the terminal device, the prompt message prompting the communication device that a first transmission time interval falls outside the first time window; and
send a second authentication request response to the terminal device, the second authentication request response comprising second time window information, the second time window information indicating a time range in which the terminal device receives the second authentication request response, and a second time window indicated by the second time window information comprising at least one transmission time interval.

18. The communication device according to claim 17, wherein the instructions, when executed by the processor, further cause the communication device to determine the first time window information based on third time window information.

19. The method according to claim 1, wherein the first time window includes multiple transmission time intervals, and the number of transmission time intervals included in the first time window is adjusted based on a degree of security.

* * * * *